(12) United States Patent
Wiegman

(10) Patent No.: US 12,358,374 B2
(45) Date of Patent: *Jul. 15, 2025

(54) SYSTEMS AND METHODS FOR EMERGENCY SHUTDOWN OF AN ELECTRIC CHARGER BY A DE-ENERGIZING PROTOCOL

(71) Applicant: BETA AIR, LLC, South Burlington, VT (US)

(72) Inventor: Herman Wiegman, South Burlington, VT (US)

(73) Assignee: BETA Air LLC, South Burlington, VT (US)

( * ) Notice: Subject to any disclaimer, the term of this patent is extended or adjusted under 35 U.S.C. 154(b) by 139 days.

This patent is subject to a terminal disclaimer.

(21) Appl. No.: 18/205,256

(22) Filed: Jun. 2, 2023

(65) Prior Publication Data

US 2023/0327463 A1     Oct. 12, 2023

Related U.S. Application Data

(63) Continuation-in-part of application No. 17/562,161, filed on Dec. 27, 2021, now Pat. No. 12,090,878, which is a continuation-in-part of application No. 17/515,451, filed on Oct. 30, 2021, now Pat. No. 11,705,743.

(51) Int. Cl.
| | |
|---|---|
| *B60L 9/00* | (2019.01) |
| *B60L 3/04* | (2006.01) |
| *B60L 53/62* | (2019.01) |
| *B64F 5/60* | (2017.01) |
| *H02J 7/00* | (2006.01) |
| *B64C 29/00* | (2006.01) |

(52) U.S. Cl.
CPC .............. *H02J 7/0029* (2013.01); *B60L 3/04* (2013.01); *B60L 53/62* (2019.02); *B64F 5/60* (2017.01); *H02J 7/00032* (2020.01); *B60L 2200/10* (2013.01); *B64C 29/0008* (2013.01)

(58) Field of Classification Search
CPC .... H02J 7/0031; H02J 7/0029; H02J 7/00032; B64F 5/60; B60L 53/62; B60L 3/0046; B60L 3/04; B60L 9/00; B60L 2200/10; B64C 29/0008
USPC .......................................... 701/22; 320/157
See application file for complete search history.

(56) References Cited

U.S. PATENT DOCUMENTS

| | | | | |
|---|---|---|---|---|
| 11,705,743 | B2* | 7/2023 | Wiegman | B60L 53/22 701/22 |
| 12,090,878 | B2* | 9/2024 | Wiegman | H02J 7/0029 |
| 2013/0127414 | A1* | 5/2013 | Ohtomo | B60L 53/62 320/109 |
| 2018/0237161 | A1* | 8/2018 | Minnick | B64U 50/37 |
| 2019/0148986 | A1* | 5/2019 | Yoo | H02J 50/10 307/104 |
| 2020/0299002 | A1* | 9/2020 | Nielsen | G05B 23/0286 |

(Continued)

*Primary Examiner* — Shardul D Patel
(74) *Attorney, Agent, or Firm* — Hoffman Warnick LLC

(57) ABSTRACT

A system for emergency shutdown of an electric charger using a de-energizing protocol is presented. The system includes a computing device, wherein the computing device is configured to receive a sensor datum from a sensor, determine a disruption element between a charging connector and an electric vehicle as a function of the sensor datum, and initiate a de-energizing protocol as a function of the disruption element.

20 Claims, 8 Drawing Sheets

(56) References Cited

U.S. PATENT DOCUMENTS

2021/0094430 A1* 4/2021 Shin .................. H02J 7/0047
2021/0237610 A1* 8/2021 Zheng ................ H02J 7/00302

* cited by examiner

SYSTEMS AND METHODS FOR EMERGENCY SHUTDOWN OF AN ELECTRIC CHARGER BY A DE-ENERGIZING PROTOCOL

CROSS-REFERENCE TO RELATED APPLICATIONS

This application is a continuation-in-part of U.S. Nonprovisional application Ser. No. 17/562,161 filed on Dec. 27, 2021, and entitled "SYSTEMS AND METHODS FOR EMERGENCY SHUTDOWN OF AN ELECTRIC AIRCRAFT PORT IN RESPONSE TO A DISCONNECTION", which is a continuation-in-part of U.S. Nonprovisional application Ser. No. 17/515,451 filed on Oct. 30, 2021, and entitled "SYSTEMS AND METHODS FOR EMERGENCY SHUTDOWN OF AN ELECTRIC CHARGER IN RESPONSE TO A DISCONNECTION", all of which are incorporated by reference herein in their entirety.

FIELD OF THE INVENTION

The present invention generally relates to the field of charging systems for electric vehicles. In particular, the present invention is directed to systems and methods for emergency shutdown of an electric charger in response to a disconnection, the system comprising.

BACKGROUND

The inception of electric powered vehicles contributed to the necessary implementation of electric vehicle (EV) charging stations to power electric vehicles. Electric vehicles allow for a quiet and efficient experience, while not requiring fossil fuels. As infrastructure around charging electric vehicles grows, it is critical to ensure the proper operation of electric vehicle chargers for safety purposes. Ensuring proper management requires meticulous consideration and implementation of various security measures to ensure optimal electrical recharging.

SUMMARY OF THE DISCLOSURE

In an aspect, a system for emergency shutdown of an electric charger by a de-energizing protocol is presented. The system includes a computing device, where the computing device is configured to receive a sensor datum from a sensor communicatively connected to a connector of an electric charger, determine a charging connection between the connector and an electric aircraft, determine a disruption element aircraft as a function of the sensor datum, and initiate a de-energizing protocol as a function of the disruption element.

In another aspect, a method for emergency shutdown of an electric charger for an electric vehicle by a de-energizing protocol is presented. The method includes receiving, by a computing device, a sensor datum from a sensor communicatively connected to a connector of an electric charger, determining, by the computing device, a charging connection between the connector and an electric aircraft, determining, by the computing device, a disruption element aircraft as a function of the sensor datum, and initiating, by the computing device, a de-energizing protocol as a function of the disruption element.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
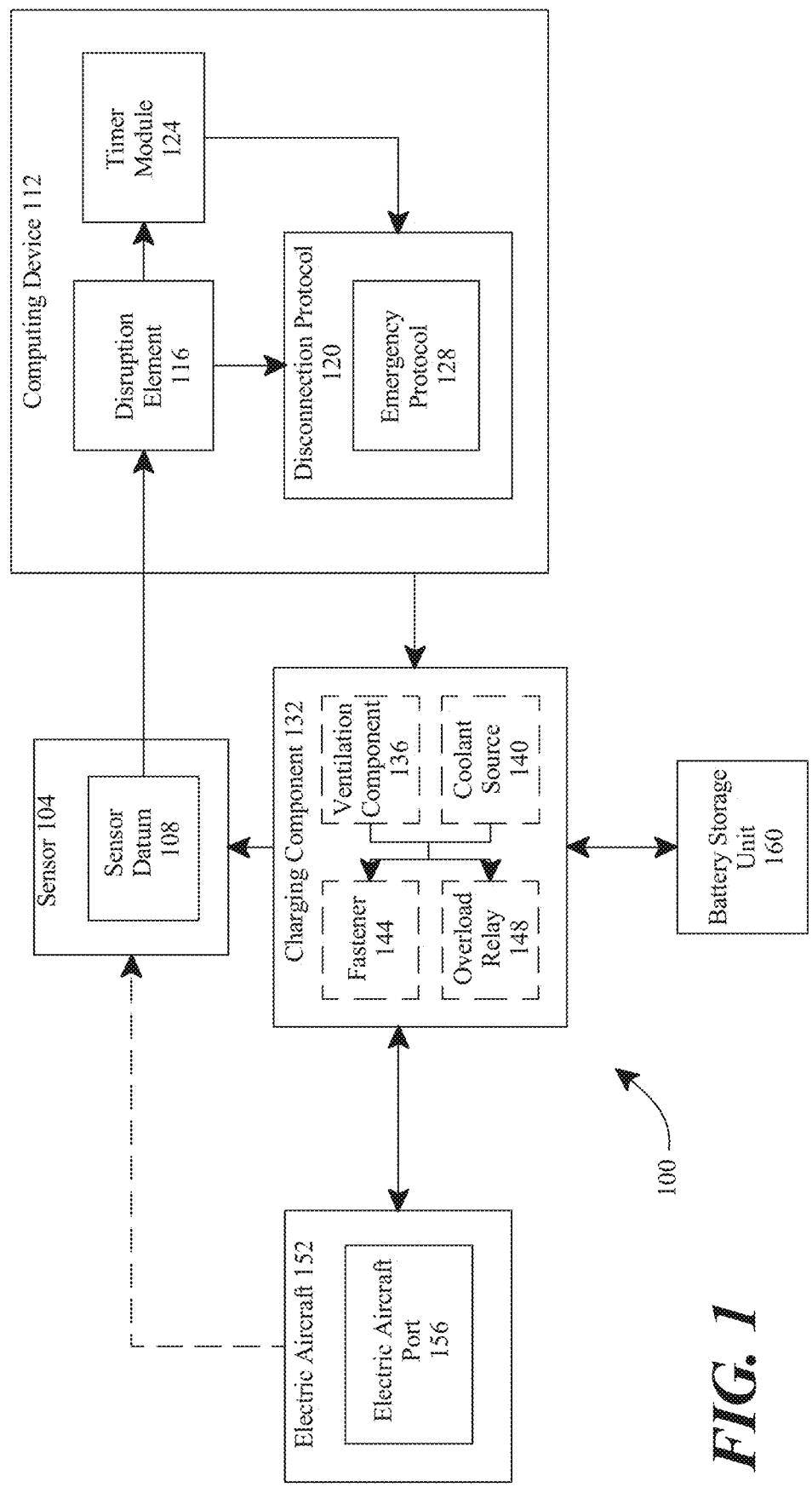
FIG. 1 is a block diagram of an exemplary embodiment of a system for an emergency shutdown of an electric charger using a de-energizing protocol.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

At a high level, aspects of the present disclosure are directed to systems and methods for an emergency shutdown of an electric charger by a de-energizing protocol. In an embodiment, aspects of the present disclosure can be used to automatically and instantly disable all connections between an electric charger and an electric aircraft, such as an electric vertical take-off and landing (eVTOL) aircraft. The electric charger is configured to physically contact a multitude of electric vehicles of all types so the present disclosure can be used to protect the electric charger from potential risks such as wear and tear of the electric charger components and its tolerance to a variety of electric aircrafts.

Aspects of the present disclosure can be used to prevent unauthorized electric vehicles from receiving charge. This is so, at least in part, to avoid wasting electrical energy resources and prevent the unauthorized vehicles from stealing electrical energy and disrupting a complicated system and network of recharging processes and procedures. Aspects of the present disclosure can be used to disable charging connections and lock all charging components in the event of a communication disruption. In a non-limiting embodiment, embodiment, a network disconnection either by an electric vehicle or the present disclosure itself may trigger a protocol to disable all charging capabilities in the risk that the communication disconnection event may be potentially hazardous. Aspects of the present disclosure can be used on a charging/recharging station where a plurality of electric vehicles can dock onto a docking terminal and/or landing pad for recharging purposes. This is so that the present disclosure can have the necessary equipment, infrastructure, and personnel to operate the charging of electric vehicles and the present disclosure.

Aspects of the present disclosure allow for blocking all connection ports in the event of any unsecure physical connection from an electrical charger. In a non-limiting embodiment, embodiment, the electrical charger and its cables may be loosely connected to the electric vehicle in which a shutdown protocol will be initiated to inform the electric aircraft and any user of the faulty connection as well as protecting the electric charger from discharging electrical energy from its power source. In an embodiment, the faulty connection may have occurred by unsuccessfully connecting the electric charger to a port of the electric aircraft by a human operator or a mechanical operator. In an embodiment, a disruptive disconnection may trigger a shutdown protocol, wherein the electrical charger is pulled out unexpectedly and/or instantly during a charging process, in which the protocol may alert the charging/recharging station of the disruption and shutdown all connections as a security measure. This is so, at least in part, to ensure measures to minimize the consequences of an accident occurring. In an embodiment, aspects of the present disclosure may detect any disruption in a charging process between the electric charger and an electric vehicle which may trigger an emergency protocol which may immediately disconnect and disable all electrical charging components. This is so, at least in part, because the any disruption during the charging process may have greater risks and potentially hazardous consequences. In an embodiment, aspects of the present disclosure may detect a disruptive connection such as the loose connection which may not pose a severe danger in which a timer may be triggered. This is so, at least in part, to alert the operator and allow for the operator to resolve the faulty connection before the timer completes its countdown or expires, in which a shutdown protocol may be initiated automatically. Exemplary embodiments illustrating aspects of the present disclosure are described below in the context of several specific examples.

Referring now to FIG. 1, a block diagram of an exemplary embodiment of a system 100 for emergency shutdown for an electric charger in response to a disconnection is illustrated. In a non-limiting embodiment, system 100 may be incorporated with a recharging station which includes a recharging landing pad and various infrastructure and/or equipment to support the functions of the components of system 100. A "recharging station," for the purpose of this disclosure, is an infrastructure that incorporates a plurality of equipment used to support the maintenance and charging of any electric vehicles. In a non-limiting embodiment, system 100 may be used for electric aircraft 152. For instance, and without limitation, the recharging station may be consistent with the recharging station in U.S. patent application Ser. No. 17/373,863 and titled, "SYSTEM FOR CHARGING FROM AN ELECTRIC VEHICLE CHARGER TO AN ELECTRIC GRID," which is incorporated in its entirety herein. In a non-limiting embodiment, the recharging station may include any infrastructure that may support the landing, docking, charging, and the like thereof, of electric aircraft 152 or a plurality of electric aircraft. The recharging station may include a docking terminal. A "docking terminal," for the purposes of this disclosure, refers to an infrastructure or hub used to hold an electric aircraft and/or connect electric devices. The docking terminal may include charging component 132 that may be connected to electric aircraft port 156 of electric aircraft 152. Persons skilled in the art, upon reviewing the entirety of this disclosure, will be aware of various embodiments of the recharging station that may house or support the use of charging component 132 for purposes as described. In one or more embodiments, charging component 132 may include an electric charger as discussed further below in this disclosure.

With continued reference to FIG. 1, in a non-limiting embodiment, system 100 may incorporate a recharging landing pad. A "recharging landing pad," for the purpose of this disclosure, is an infrastructure designed to support the landing and charging of a plurality of electric aircrafts. For instance, and without limitation, the recharging landing pad may be consistent with the recharging landing pad in U.S. patent application Ser. No. 17/361,911 and title, "RECHARGING STATION FOR ELECTRIC AIRCRAFTS AND A METHOD OF ITS USE," which is incorporated in its entirety herein. Recharging landing pad may incorporate system 100 to charge electric aircrafts. In a non-limiting embodiment, sensor 104 may be disposed on recharging landing pad. For example, and without limitation, sensor 104 may detect nearby electric aircraft in the air which may be descending onto the electric aircraft. In a non-limiting embodiment, sensor 104 may be disposed on the recharging landing pad to detect, monitor, and maintain the descent, land, charging, and take-off of the electric aircraft onto the recharging pad. This is so, at least in part, to accurately measure the electric aircraft wherein sensor 104 is disposed on a location on the recharging landing pad that is ideal in connecting incoming electric aircrafts to the recharging landing pad for recharging. Persons skilled in the art, upon reviewing the entirety of this disclosure, will be aware of the various embodiments of the recharging landing pad and the configuration of the placement of sensor 104 for purposes as described herein.

With continued reference to FIG. 1, system 100 includes a computing device 112. In a non-limiting embodiment, computing device 112 may include a flight controller. The flight controller may be coupled onto electric aircraft 152. Computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 112 may include a single computing device operating independently, or may include two or more computing device operating in concert, in parallel, sequentially or the like; two or more computing devices may be included together in a single computing device or in two or more computing devices. computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 112 may include but is not limited to, for example, a computing device or cluster of computing devices in a first location and a second computing device or cluster of computing devices in a second location. computing device 112 may include one or more computing devices dedicated to data storage, security, distribution of traffic for load balancing, and the like. computing device 112 may distribute one or more computing tasks as described below across a plurality of computing devices of computing device, which may operate in parallel, in series, redundantly, or in any other manner used for distribution of tasks or memory between computing devices. computing device 112 may be implemented using a "shared nothing" architecture in which data is cached at the worker, in an embodiment, this may enable scalability of system 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 112 and/or the flight controller may be controlled by one or more Proportional-Integral-Derivative (PID) algorithms driven, for instance and without limitation by stick, rudder and/or thrust control lever with analog to digital conversion for fly by wire as described herein and related applications incorporated herein by reference. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. A similar philosophy to attachment of flight control systems to sticks or other manual controls via pushrods and wire may be employed except the conventional surface servos, steppers, or other electromechanical actuator components may be connected to the cockpit inceptors via electrical wires. Fly-by-wire systems may be beneficial when considering the physical size of the aircraft, utility of for fly by wire for quad lift control and may be used for remote and autonomous use, consistent with the entirety of this disclosure. The computing device may harmonize vehicle flight dynamics with best handling qualities utilizing the minimum amount of complexity whether it be additional modes, augmentation, or external sensors as described herein.

With continued reference to FIG. 1, sensor 104 may include one or more sensors. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal. In one or more embodiments, and without limitation, sensor 104 may include a plurality of sensors. In one or more embodiments, and without limitation, sensor 104 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 104 may be a contact or a non-contact sensor. For instance, and without limitation, sensor 104 may be connected to electric aircraft 152, electric aircraft port 156, charging component 132, and/or a computing device 112. In other embodiments, sensor 104 may be remote to electric aircraft 152, electric aircraft port 156, charging component 132, and/or computing device 112. In a non-limiting embodiment, computing device 112 may include a pilot control, a controller, such as a flight controller, and the like thereof. In one or more embodiments, sensor 104 may transmit/receive signals to/from computing device 112. Signals may include electrical, electromagnetic, visual, audio, radio waves, or another undisclosed signal type alone or in combination.

With continued reference to FIG. 1, sensor 104 may include a plurality of independent sensors, where any number of the described sensors may be used to detect any number of physical or electrical quantities associated with communication of the charging connection. Independent sensors may include separate sensors measuring physical or electrical quantities that may be powered by and/or in communication with circuits independently, where each may signal sensor output to a computing device 112 such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 104 to detect phenomenon may be maintained.

Still referring to FIG. 1, sensor 104 may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, torque sensor, gyroscope, accelerometer, torque sensor, magnetometer, inertial measurement unit (IMU), pressure sensor, force sensor, proximity sensor, displacement sensor, vibration sensor, LIDAR sensor, and the like thereof. In a non-limiting embodiment, sensor 104 ranges may include a technique for the measuring of distances or slant range from an observer including sensor 104 to a target which may include a plurality of outside parameters. "Outside parameter," for the purposes of this disclosure, refers to environmental factors or physical electric vehicle factors including health status that may be further captured by a sensor 104. For example, and without limitation, health status may include a health of a flight component of electric aircraft 152, a health of power supply of electric aircraft 152, a health of charging component 132, and the like. In one or more embodiments, a health of a flight component may include a condition status of a flight component. A "condition status" of a flight component, for the purposes of this disclosure, is a state of operation of a flight component. For example, and without limitation, an condition status of a flight component of electric aircraft may be considered "poor" or "unoperational" (e.g., unfit for use during operation of electric aircraft) if the flight component does not operate or actuate as intended (e.g., does not move at all or does not move properly during operation of electric aircraft). In another example, and without limitation, a condition status of flight component of electric aircraft may be determined to be "acceptable" or "operational" (e.g., fit for use during operation of electric aircraft) if the flight component operates as intended (e.g., moves properly so that electric aircraft may operate in all stages of flight, such as taxiing, take-off, landing, flight, and the like). The outside parameter may include, but not limited to air density, air speed, true airspeed, relative airspeed, temperature, humidity level, and weather conditions, among others. The outside parameter may include velocity and/or speed in a plurality of ranges and direction such as vertical speed, horizontal speed, changes in angle or rates of change in angles like pitch rate, roll rate, yaw rate, or a combination thereof, among others. The outside parameter may further include physical factors of the components of the electric aircraft itself including, but not limited to, remaining fuel or battery. The outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may target an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 may further include a sensor suite. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. In a non-limiting embodiment, sensor 104 may include a proximity sensor. A "proximity sensor," for the purpose of this disclosure, is a sensor configured to detect the presence of nearby aircrafts or environmental objects in the air. In a non-limiting embodiment, the proximity sensor may include, for example, a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In an embodiment, the proximity sensor may be configured to detect the location of an incoming electric aircraft, the distance of the electric aircraft from the proximity sensor, the attitude and/or altitude of the electric aircraft, and the velocity or deacceleration of the electric aircraft as it descends onto the recharging landing pad of system 100 to recharge its battery. In some embodiment, the proximity sensor may include, a capacitive sensor, a capacitive displacement sensor, a Doppler effect (sensor based on doppler effect) sensor, an inductive sensor, a magnetic sensor, an optical sensor, a photoelectric sensor, a laser rangefinder sensor, a passive thermal infrared sensor, a radar, a sonar, an ultrasonic sensor, a fiber optics sensor, a Hall effect sensor, and the like thereof. At least a sensor 104 may include circuitry, computing devices, electronic components or a combination thereof that translates sensor datum 108 into at least an electronic signal configured to be transmitted to another electronic component.

With continued reference to FIG. 1, in some embodiments, sensor 104 may include a pressure sensor. A "pressure", for the purposes of this disclosure, and as would be appreciated by someone of ordinary skill in the art, is a measure of force required to stop a fluid from expanding and is usually stated in terms of force per unit area. In non-limiting exemplary embodiments, a pressure sensor may be configured to measure an atmospheric pressure and/or a change of atmospheric pressure. In some embodiments, a pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, a pressure sensor may be configured to transform a pressure into an analogue electrical signal. In some embodiments, the pressure sensor may be configured to transform a pressure into a digital signal. In one or more embodiments, sensor 104 may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor.

With continued reference to FIG. 1, in one or more embodiments, sensor 104 may include electrical sensors. Electrical sensors may be configured to measure voltage across a component, electrical current through a component, and resistance of a component. In one or more embodiments, sensor 104 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 104, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection. In some embodiments, sensor 104 may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, in one or more embodiments, sensor 104 may include a sensor suite which may include a plurality of sensors that may detect similar or unique phenomena. For example, in a non-limiting embodiment, a sensor suite may include a plurality of voltmeters or a mixture of voltmeters and thermocouples. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or electrical quantities that may be powered by and/or in communication with circuits independently, where each may signal sensor output to a computing device 112 such as computing device 112. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained. In one or more embodiments, sensor 104 may include a sense board. A sense board may have at least a portion of a circuit board that includes one or more sensors configured to, for example, measure a temperature of the battery pack of electric aircraft 152, battery storage unit 160 incorporated with charging component 132, and the like thereof. In one or more embodiments, a sense board may be connected to one or more battery modules or cells of a power source. In one or more embodiments, a sense board may include one or more circuits and/or circuit elements, including, for example, a printed circuit board component. A sense board may include, without limitation, computing device 112 configured to perform and/or direct any actions performed by the sense board and/or any other component and/or element described in this disclosure. The computing device 112 may include any analog or digital control circuit, including without limitation a combinational and/or synchronous logic circuit, a processor, microprocessor, microcontroller, or the like.

With continued reference to FIG. 1, computing device is configured to receive a sensor datum 108. In a non-limiting embodiment, sensor 104 may be configured to detect sensor datum 108. A "sensor datum," for the purpose of this disclosure, is any datum or element of data describing parameters captured by sensor 104 describing the outside environment and physical values describing the performance or qualities of flight components of electric aircraft 152. For example and without limitation, sensor datum 108 may include, but is not limited to, battery quality, battery life cycle, remaining battery capacity, current, voltage, pressure, temperature, moisture level, and the like. In a non-limiting embodiment, sensor datum 108 may include any data captured by any sensor as described in the entirety of this disclosure. Additionally and alternatively, sensor datum 108 may include any element or signal of data that represents an electric aircraft route and various environmental or outside parameters. In a non-limiting embodiment, sensor datum 108 may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, sensor 104 may detect a battery pack datum from electric aircraft 152. The battery pack datum may be part of sensor datum 108. A "battery pack datum," for the purpose of this disclosure, is an element of data representative of one or more characteristics corresponding to at least a portion of a battery pack of an electric aircraft and/or its components. A "battery pack," for the purpose of this disclosure, is a set of any number of individual battery modules or identical battery modules configured to power the electric aircraft. A "battery module", for the purpose of this disclosure, is a source of electric power consisting of one or more electrochemical cells. In a non-limiting embodiment, the battery pack datum may include any data and/or information about the state of the battery pack. the battery pack datum may include information about the make and model of the battery pack, rate of recharge of the battery pack, rate of discharge of the battery pack, and the like thereof. This is so, at least in part, to provide information that may be used to charge the electric aircraft with a compatible electric charging device and optimal amount of electric energy. Persons skilled in the art, upon reviewing the entirety of this disclosure, will be aware of the various battery information used for charging and purposes as described herein.

With continued reference to FIG. 1, the battery pack datum may include at least an electrical parameter which may include, without limitation, voltage, current, impedance, resistance, and/or temperature. The current may be measured by using a sense resistor in series with the circuit and measuring the voltage drop across the resister, or any other suitable instrumentation and/or methods for detection and/or measurement of current. The voltage may be measured using any suitable instrumentation or method for measurement of voltage, including methods for estimation as described in further detail below. Each of resistance, current, and voltage may alternatively or additionally be calculated using one or more relations between impedance and/or resistance, voltage, and current, for instantaneous, steady-state, variable, periodic, or other functions of voltage, current, resistance, and/or impedance, including without limitation Ohm's law and various other functions relating impedance, resistance, voltage, and current with regard to capacitance, inductance, and other circuit properties. For example and without limitation, the battery pack datum may include a voltage of a battery pack to be 800 volts while second battery pack. In another non-limiting example, the battery pack datum may include a current of a battery pack to be 200 kWh. In a non-limiting embodiment, the battery pack datum may include a temperature datum. A "temperature datum," for the purposes of this disclosure, is any datum or element of data describing the temperature of a battery pack. Temperature datum may include a heating parameter and a cooling parameter. Heating parameter may include a rate of temperature increase of the battery pack. Cooling parameter may include a rate of temperature decrease of a battery pack. For example and without limitation, temperature datum may include a temperature of 60 to 80 degrees Fahrenheit. For example and without limitation, cooling parameter may include a temperature of a battery to be any temperature below 40 degrees Fahrenheit. For example and without limitation, heating parameter may include a temperature of a battery to be any temperature above 200 degrees Fahrenheit. Persons skilled in the art, upon reviewing the entirety of this disclosure, will be aware of the various data surrounding the battery of an electric aircraft for purposes as described herein.

With continued reference to FIG. 1, sensor datum 108 may include information indicative of the location of charging component 132 relative to electric aircraft port 156. In a non-limiting embodiment, sensor 104 may detect the proximity of electric aircraft port 132 relative to charging component 132 of the recharging landing pad of system 100. For example and without limitation, sensor 104 disposed on charging component 132 may detect if electric aircraft 152 and its electric aircraft port 156 are within a certain distance for charging component 132 to physically form a connection with electric aircraft port 156 to transfer electric energy. In a non-limiting embodiment, sensor 104 may be disposed onto an infrastructure designed to support the landing and charging of a plurality of electric aircrafts. "Disposed," for the purpose of this disclosure, is the physical placement of a computing device on a component of a charging connector (also referred to herein as a "connector"). In another non-limiting example, sensor datum 108 may inform computing device 112 if electric aircraft 152 is too far for charging component 132 to reach electric aircraft port 156 of electric aircraft 152, wherein computing device 112 may generate an alert to inform any personnel or electric aircraft 152 of the situation. Persons skilled in the art, upon reviewing the entirety of this disclosure, will be aware of the various embodiments of proximity data for accurate and safe charging and connection for purposes as described herein.

With continued reference to FIG. 1, sensor datum 108 may include a battery parameter set. A "battery parameter set," for the purpose of this disclosure, is an element of data representing physical values and/or identifiers of an electric aircraft, the electric aircraft's actuators and/or flight components, and the electric aircraft's charging components. For instance, and without limitation, the battery parameter set may be consistent with the battery parameter set in U.S. patent application Ser. No. 17/407,518 and titled, "SYSTEM AND METHOD FOR COMMUNICATING A PRE-CHARGING PACKAGE STREAM OF AN ELECTRIC AIRCRAFT," which is incorporated in its entirety herein. For example and without limitation, electric aircraft 152 may generate its own battery parameter set in which the pilot of electric aircraft 152 may transmit the battery parameter set to computing device 112, which may be first received and/or detected by sensor 104, through any means of digital communication, which may include being connected to a network, in order for computing device 112 to generate a disconnection protocol 120 for electric aircraft 152. In one or more embodiments, disconnection protocol 120 may include a deenergizing protocol, as discussed further in this disclosure below. This is so, at least in part, to provide computing device 112 useful information in generating disconnection protocol 120 tailored to electric aircraft 152 or to any other electric aircraft.

With continued reference to FIG. 1, the battery parameter set may include a datum including battery parameters. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor may include circuitry, computing devices, electronic components or a combination thereof that translates any datum into at least an electronic signal configured to be transmitted to another electronic component. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The battery parameter set may include a plurality of individual battery parameters. A "battery parameter," for the purposes of this disclosure, refers to a measured value associated with electric aircraft 152 its battery pack. Battery parameter may include a state of charge of the battery pack. A "state of charge," for the purposes of this disclosure, refers to the level of charge of the electric battery relative to its capacity. Battery parameter may include a charge cycle. A "charge cycle," for the purposes of this disclosure, refers the process of charging a rechargeable battery and discharging it as required into a load. The term is typically used to specify a battery's expected life, as the number of charge cycles affects life more than the mere passage of time. A person of ordinary skill in the art, after viewing the entirety of this disclosure, would appreciate the plurality of measured values in the context of battery charging.

With continued reference to FIG. 1, the battery parameter set may include at least a charge requirement. A "charge requirement, for the purpose of this disclosure, refers to an element of data representing physical or electronic values that identify compatible parameters for charging. The at least charge requirement may include, but not limited to, battery capacity of the electric aircraft, battery charge cycle, maximum battery capacity, minimum battery capacity, and the like thereof. The at least a charge requirement may include a plurality of maximum charge current for a plurality of battery types. In a non-limiting embodiment, charge requirement may include a minimum charge current to be 15% to 25% of the maximum battery capacity of a battery pack of electric aircraft 152. In a non-limiting embodiment, the at least a charge requirement may include a maximum charging current to be 50% for a gel battery, 50% for an AGM battery and the like thereof. In a non-limiting embodiment, the at least a charge requirement may include a plurality of different types of chargers designated for different types of electric aircrafts, different types of electric aircraft batteries, and different types of charging.

With continued reference to FIG. 1, in a non-limiting embodiment, the at least charge requirement may include a classification label for type of charger to be used on a battery pack in which the battery pack is assigned a classification label based on the quality of life of the battery pack. For example and without limitation, electric aircraft 152 with a low level classification level may denote a level 1 charger to be used which may be included in the battery parameter set. For instance, a battery pack with a degraded quality of life and/or smaller capacitive load may be designated a level 1 charger configured to slowly charge the battery pack to avoid exposure to high electric current that may lead to considerable stress or damage to the battery pack and electric aircraft 152. For example and without limitation, the battery pack may be designated to a low level classification label as a function of the priority of the charging of the electric aircraft. In a non-limiting embodiment, the battery parameter set may include information regarding the type of travel of an electric aircraft. For example and without limitation, if electric aircraft 152 is intended to fly a low priority flight, the battery parameter set may denote a low level classification label to the electric aircraft 152 in which a level 1 charger may be assigned to charge electric aircraft 152. For example and without limitation, the at least a charge requirement of the battery parameter set for electric aircraft 152 may include a charge duration of 40 hours. In a non-limiting embodiment, a battery pack of electric aircraft 152 may be classified with an average level classification label and denote the use of a level 2 charger. For example and without limitation, electric aircraft 152 intended for a long flight may denote a level 2 charger and average level classification label in which the battery parameter set may denote such information and designate a level 2 charger to better charge the electric aircraft 152 as a result of the battery parameter set. For example and without limitation, the battery parameter set denoting an average level classification label may include the at least a charge requirement containing a charge rate of 6 kW. In a non-limiting embodiment, the battery parameter set for electric aircraft with an average level classification label may include a charge duration of 6 hours. In a non-limiting embodiment, a high level classification label may be assigned to an electric aircraft 152 and denote a level 5 charger for high priority flights. In a non-limiting embodiment, a high level classification label may be assigned to electric aircraft 152 with a battery pack containing a high capacitive load which may endure fast electrical current. For example and without limitation, electric aircraft 152 that may be intended to fly important persons or emergency flights may denote a high level classification label in which the battery parameter set may assign the electric aircraft to a level 5 charger for fast charging of electric aircraft 152. For example and without limitation, High level classification label may include the at least a charge requirement containing a charge rate of 50-60 kW. In a non-limiting embodiment, the battery parameter set for an electric aircraft with a high level classification label may include a charge duration of 2 hours. A person of ordinary skill in the art, after viewing the entirety of this disclosure, would appreciate the charge requirement identifying an electric aircraft in the context of batteries.

With continued reference to FIG. 1, the battery parameter set further includes at least a charging parameter. A "charging parameter," for the purposes of this disclosure, refers to a measure value associate with the charging of a power source of an electric aircraft. At least a charging parameter may include any data associated with charging of the battery of an electric aircraft. For example and without limitation, at least a charging parameter may include a target charge voltage for the battery, battery capacity, maximum charging time, and the like. In a non-limiting embodiment, charging parameter may include a classification label as described in the entirety of this disclosure. In a non-limiting embodiment, charging parameter may include a plurality of data describing battery parameters including, but not limited to, battery type, battery life cycle, and the like thereof. For example and without limitation, battery parameter may include a life cycle of 5 years. For example and without limitation, battery parameter may include battery types such as, but not limited to, lead acid, nickel cadmium (NiCd), nickel-metal hydride (Ni—MH), lithium-ion/lithium polymer, lithium metal, and the like thereof. In a non-limiting embodiment, battery parameter may include a plurality of threats associated with a battery pack. For example and without limitation, the battery parameter set may include threats such as, but not limited to, battery leakage, battery overcharging, excessive battery charging rate, excessive battery discharge rate, battery bus fault, and the like thereof.

With continued reference to FIG. 1, the battery parameter set further includes at least a cooling parameter. A "cooling parameter," for the purposes of this disclosure, refers to a measured value associated with the health status of the battery after charging. The at least a cooling parameter may include any data associated with cooling the battery after charging. For example and without limitation, the at least a cooling parameter may include target temperature, maximum cooling time, minimum cooling time, any data associated with the flight plan, such as destination, payload size, etc., any data associated with the aircraft metrics, such as weight, size, etc., any data associated with the exterior weather, such as air pressure, humidity, and the like. In a non-limiting embodiment, the at least cooling parameter may include a charge process and a discharge process. For example and without limitation, charge process may include a charge process rate of 1/1 degrees Celsius, charge process temperature rise of 12.57 degrees Celsius, charge process heating power of 5.42 W, and the like thereof. For example and without limitation, discharge process may include a discharge process rate of 1 degrees Celsius, a discharge process temperature rise of 15.28 degrees Celsius a discharge process heating power of 4.60 W, and the like thereof. Persons skilled in the art, upon reviewing the entirety of this disclosure, will be aware of the various parameters of thermodynamics with the at least a cooling parameter consistent with this disclosure.

Still referring to FIG. 1, sensor datum 108 may include a state of charge (SOC) of the battery pack of the electric vehicle such as electric aircraft 152. A "state of charge," A "state of charge," for the purpose of this disclosure, is a level of charge relative to capacity, for instance the state of charge may be represented proportionally or as a percentage. The battery pack datum may include a state of health of the battery pack. A "state of health," for the purpose of this disclosure, is a figure of merit compared to ideal conditions. In some cases, the state of health may be represented as a percentage, for example percentage of battery conditions matching battery specifications. Current may be measured by using a sense resistor in series with the circuit and measuring the voltage drop across the resister, or any other suitable instrumentation and/or methods for detection and/or measurement of current. Voltage may be measured using any suitable instrumentation or method for measurement of voltage, including methods for estimation as described in further detail below. Each of resistance, current, and voltage may alternatively or additionally be calculated using one or more relations between impedance and/or resistance, voltage, and current, for instantaneous, steady-state, variable, periodic, or other functions of voltage, current, resistance, and/or impedance, including without limitation Ohm's law and various other functions relating impedance, resistance, voltage, and current with regard to capacitance, inductance, and other circuit properties.

With continued reference to FIG. 1, sensor datum 108 may include a thermal overload datum. A "thermal overload datum," for the purpose of this disclosure, is any datum captured by thermal overload relay 148. The thermal overload datum may include any data denoting any change in load such as, but not limited to, a load effect. A "load effect," for the purpose of this disclosure, is a power supply specification (load regulation) that describes how well a power supply can maintain its steady-state output setting when the load changes. In a non-limiting embodiment, the load effect may include load changes of the battery pack of electric aircraft 152. In another non-limiting embodiment, the load effect may include load changes of battery storage unit 160 incorporated with charging component 132. In a non-limiting embodiment, the load effect may specify the maximum change in steady-state DC output voltage and/or current resulting from a specified change in the load voltage and/or load current. Persons skilled in the art, upon reviewing the entirety of this disclosure, will be aware of the various embodiments of load effect and the thermal overload datum for purposes described herein.

Still referring to FIG. 1, for instance, and without limitation, sensor 104 may detect a connection status, which may be detected as part of sensor datum 108. A "connection status," for the purpose of this disclosure, is a determination of a presence of a connection is present, established, and/or disconnected between charging component 132 and electric aircraft 152 and/or electric aircraft port 156. For example and without limitation, the connection status may include a boolean classification denoting that a connection is made or not. In another non-limiting example, the connection status may include a status of "pending" wherein sensor 104 recognizes that a connection is to be made and monitors the process of establishing a connection between charging component 132 and electric aircraft 152 and its electric aircraft port 156. In a non-limiting embodiment, the connection status may include a status of "connected," denoting that a connection has been successfully established. For example and without limitation, sensor 104 may monitor the connecting process and transmit a confirmation signal to computing device 112 that the connection is valid and successfully made. In another non-limiting embodiment, the connection status may include a status of "disconnected," denoting that a connection has been properly and/or successfully disconnected between charging component 132 and electric aircraft 152 and its electric aircraft port 156. For example and without limitation, after the completion of a successful action by charging component 132 and electric aircraft 152, the connection between them may be disconnected to ensure the completion of a charging process. A "charging process," for the purposes of this disclosure, is any process of electrical energy transfer between two or more electrical devices. In a non-limiting embodiment, the charging process may include charging component 132 power electric aircraft 152 and its battery pack. For example and without limitation, charging component 132 may use its own source and/or storage of electrical energy such as battery storage unit 160 to power the battery pack of electric aircraft 152.

With continued reference to FIG. 1, sensor 104 may recognize that a charging connection has been created between charging component 132 and electric aircraft 152 and its electric aircraft port 156 that facilitates communication between charging component 132 and electric aircraft 152. For example, and without limitation, sensor 104 may identify a change in current through a charging connector of charging component 132, indicating the charging connector is in electric communication with, for example, a port of electric aircraft 152, as discussed further below. For the purposes of this disclosure, a "charging connection" is a connection associated with charging a power source, such as, for example, a battery. The charging connection may be a wired or wireless connection, as discussed further below in this disclosure. The charging connection may include a communication between charging component 132 and electric aircraft 152. For example, and without limitation, one or more communications between charging component 132 and electric aircraft 152 may be facilitated by the charging connection. The charging connection may be facilitated by one or more communication wires (e.g., conductors) that are disposed at least partially within charging connector of charging component 132, as discussed further below in this disclosure. In one or more embodiments, communication wires facilitate charging where a communication between charging component 132 and electric aircraft 152 may be established when charging connector is plugged into a port of electric aircraft, and the communication is terminated when charging connector is disconnected from the port of electric aircraft. As used in this disclosure, "communication" is an attribute where two or more relata interact with one another, for example, within a specific domain or in a certain manner. In some cases, communication between two or more relata may be of a specific domain, such as, and without limitation, electric communication, fluidic communication, informatic communication, mechanic communication, and the like. As used in this disclosure, "electric communication" is an attribute wherein two or more relata interact with one another by way of an electric current or electricity in general. For example, and without limitation, a communication between charging component 132 and electric aircraft 152 may include an electric communication. As used in this disclosure, a "fluidic communication" is an attribute wherein two or more relata interact with one another by way of a fluidic flow or fluid in general. For example, and without limitation, a coolant may flow between charging component 132 and electric aircraft 152 when there is a charging connection between charging component 132 and electric aircraft 152. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

In one or more embodiments, communication of the charging connection may include various forms of communication. For example, and without limitation, an electrical contact without making physical contact, for example, by way of inductance, may be made between charging component 132 and electric aircraft 152 to facilitate communication. In another example, and without limitation, communication of the charging connection an electrical connection made using physical contact using, for example, conductors of a connector of charging component 132. For instance, and without limitation, charging component 132 may include one or more charging cables that each include a conductor, which has a distal end approximately located within charging component 132 and a proximal end approximately located at an energy source of charging unit. As used in this disclosure, a "conductor" is a component that facilitates conduction. As used in this disclosure, "conduction" is a process by which one or more of heat and/or electricity is transmitted through a substance, for example, when there is a difference of effort (i.e., temperature or electrical potential) between adjoining regions. In some cases, conductor may be configured to charge and/or recharge electric aircraft. For instance, and without limitation, conductor may be connected to an energy source of a charging unit and conductor may be designed and/or configured to facilitate a specified amount of electrical power, current, or current type. For example, conductor may include a direct current conductor. As used in this disclosure, a "direct current conductor" is a conductor configured to carry a direct current for recharging an energy source of an electric aircraft. As used in this disclosure, "direct current" is one-directional flow of electric charge. In some cases, conductor may include an alternating current conductor. As used in this disclosure, an "alternating current conductor" is a conductor configured to carry an alternating current for recharging an energy source of electric aircraft 152. As used in this disclosure, an "alternating current" is a flow of electric charge that periodically reverse direction; in some cases, an alternating current may change its magnitude continuously with in time (e.g., sine wave).

With continued reference to FIG. 1, conductor may include one or more proximity pins. For the purposes of this disclosure, a "proximity pin" is a portion of a conductor configured to indicate a charging connection exists between a charging component and an electric aircraft port. Proximity pins may ensure charging component and port are connected and that there is communication between the charging component and electric aircraft. Proximity pin may indicate that electrical power is flowing between one or more conductors of charging component 132 and electric aircraft 152.

With continued reference to FIG. 1, in one or more embodiments, conductor may include a high-voltage conductor. In a non-limiting embodiment, high-voltage conductor may be configured for a potential no less than 100 V. In some embodiments, high-voltage conductor may include a direct current (DC) conductor. High-voltage conductor may include a DC conductor pin, which extends from housing of charging component 132 and allows for the flow of DC power into and out of electric aircraft 152 using port 156. In other embodiments, high-voltage conductor may include an alternating current (AC) conductor. An AC conductor may include any component responsible for the flow of AC power into and out of the electric aircraft. The AC conductor may include a pin that extends from housing that may allow for a transfer of electrical power between charging component 132 and power source of electrical aircraft 152. In some embodiments, a pin of high-voltage conductor may include a live pin, such that the pin is the supply of DC or AC power. In other embodiments, pin of high-voltage conductor may include a neutral pin, such that the pin is the return path for DC or AC power.

With continued reference to FIG. 1, conductor may include a low-voltage conductor. In a non-limiting embodiment, low-voltage conductor may be configured for a potential no greater than 100 V. Low-voltage conductor may be configured for AC or DC current. In one or more embodiments, low-voltage conductor may be used as an auxiliary charging connector to power auxiliary equipment of electric aircraft. In some embodiments, auxiliary equipment may only be powered using low-voltage conductor such that auxiliary equipment is not powered after charging, thus, auxiliary equipment may be off during in-flight activities.

With continued reference to FIG. 1, high-voltage conductor and low-voltage conductor may receive an electrical charging current from an energy source of charging component 132. As used in this disclosure, an "energy source" is a source of electrical power, for example, for charging a battery. In some cases, energy source may include a charging battery (i.e., a battery used for charging other batteries). A charging battery is notably contrasted with an electric aircraft energy source or battery, which is located, for example, upon electric aircraft 152. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Energy source may house a variety of electrical components. In one embodiment, energy source may contain a solar inverter. Solar inverter may be configured to produce on-site power generation. In one embodiment, power generated from solar inverter may be stored in a charging battery. In some embodiments, charging battery may include a used electric aircraft battery no longer fit for service in an aircraft.

In some embodiments, and still referring to FIG. 1, charging battery may have a continuous power rating of at least 350 kVA. In other embodiments, charging battery may have a continuous power rating of over 350 kVA. In some embodiments, charging battery may have a battery charge range up to 950 Vdc. In other embodiments, charging battery may have a battery charge range of over 950 Vdc. In some embodiments, charging battery may have a continuous charge current of at least 350 amps. In other embodiments, charging battery may have a continuous charge current of over 350 amps. In some embodiments, charging battery may have a boost charge current of at least 500 amps. In other embodiments, charging battery may have a boost charge current of over 500 amps. In some embodiments, charging battery may include any component with the capability of recharging an energy source of an electric vehicle. In some embodiments, charging battery may include a constant voltage charger, a constant current charger, a taper current charger, a pulsed current charger, a negative pulse charger, an IUI charger, a trickle charger, and a float charger.

In one or more embodiments, conductor may be an electrical conductor, for example, a wire and/or cable, as previously mentioned above in this disclosure. In one or more embodiments, conductor may be disposed within an insulation, such as an insulation sleeve that conductor is at least partially disposed within. For example, and without limitation, conductor may be covered by insulation except for at conductor pin, which may contact a component or interface of port 156 of electric aircraft 152 as part of mating component (e.g., fastener 144) of charging component 132. Exemplary conductor materials include metals, such as without limitation copper, nickel, steel, and the like. In one or more embodiments, a contact of charging component 132 may be configured to provide electrical communication with a mating component within a port of electric aircraft 152. In one or more embodiments, contact may be configured to mate with an external connector. As used in this disclosure, a "charging connector" is a distal end of a tether or a bundle of tethers, e.g., hose, tubing, cables, wires, and the like, which is configured to removably attach with a mating component, for example without limitation a port. As used in this disclosure, a "port" is an interface for example of an interface configured to receive another component or an interface configured to transmit and/or receive signal on a computing device. For example, in the case of an electric vehicle port, the port interfaces with a number of conductors and/or a coolant flow path by way of receiving a connector. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

Still referring to FIG. 1, system 100 may include charging component 132. In a non-limiting embodiment, sensor 104 may be disposed within charging component 132 or attached to charging component 132. In another non-limiting embodiment, charging connector may be electrically connected to computing device 112. A "charging component," for the purpose of this disclosure, is any physical connector used as a hub of transfer for electrical energy which may include a distal end of a tether or a bundle of tethers, e.g., hose, tubing, cables, wires, and the like, which is configured to removably attach with a mating component, for example without limitation a port. As used in this disclosure, a "port" is an interface for example of an interface configured to receive another component or an interface configured to transmit and/or receive signal on a computing device. For instance and without limitation, charging component 132 may be consistent with the charging connector in U.S. patent application Ser. No. 17/407,518 and titled, "SYSTEM AND METHOD FOR COMMUNICATING A PRE-CHARGING PACKAGE STREAM OF AN ELECTRIC AIRCRAFT," which is incorporated in its entirety herein. In a non-limiting embodiment, charging component 132 may connect to the electric aircraft 152 via electric aircraft port 156. An "electric aircraft port," for the purpose of this disclosure, is an interface configured to mate with any connector for transferring electrical energy. For example and without limitation, sensor 104 may be attached onto charging component 132 to better detect location relativity of connection charger 128 to electric aircraft port 156. In a non-limiting embodiment, charging component 132 may mate with electric aircraft port 156 as a function of sensor 104 disposed onto charging component 132 and forming a physical connection and/or mechanical connection. In a non-limiting embodiment, charging component 132 may include a male component having a penetrative form and port may include a female component having a receptive form, receptive to the male component. Alternatively or additionally, charging component 132 may have a female component and port may have a male component. In some cases, connector may include multiple connections, which may make contact and/or communicate with associated mating components within port, when the connector is mated with the port. In a non-limiting embodiment, charging component 132 may include a housing. As used in this disclosure, a "housing" is a physical component within which other internal components are located. In some cases, internal components with housing will be functional while function of housing may largely be to protect the internal components. The housing and/or connector may be configured to mate with a port, for example an electric aircraft port 156. As used in this disclosure, "mate" is an action of attaching two or more components together. Mating may be performed using a mechanical or electromechanical means described in this disclosure. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable. In some cases, mating may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of charging component 132. In some cases, mate may be lockable. As used in this disclosure, an "electric vehicle" is any electrically power means of human transport, for example without limitation an electric aircraft or electric vertical take-off and landing aircraft. In some cases, an electric vehicle will include a battery pack configured to power at least a motor configured to move the electric aircraft 104. In a non-limiting embodiment, electric aircraft port 156 may be configured to support bidirectional charging. A "bidirectional charging," for the purpose of this disclosure, is a charging that allows for the flow of electricity to go two ways. In a non-limiting embodiment, charging component 132 may provide electric energy to the battery pack of an electric aircraft from a power source such as an electric grid and also receive electric energy from an electric aircraft and its battery pack. For example and without limitation, electric aircraft port 156 may act as a hub for the transfer of electrical energy. In a non-limiting embodiment, electric aircraft port 156 may be integrated into a system supporting vehicle-to-grid (V2G) charging. For example and without limitation, electric aircraft port may be used to transfer electric energy from the battery pack of an electric aircraft 152 to charge a power source and/or battery pack of a charging component 132. Charging component 132 may include a universal charger and/or common charger. For example and without limitation, charging component 132 may draw power from a variety of input voltages. Persons skilled in the art, upon reviewing the entirety of this disclosure, will be aware of various configurations of the electric aircraft port 156 that may be utilized for various charging methodologies consistent with this disclosure.

With continued reference to FIG. 1, charging component 132 may be supplied by battery storage unit 160. A "battery storage unit," for the purposes of this disclosure, refer to a device or station that may include a plurality of batteries to be used to store electrical energy. In a non-limiting embodiment, battery storage unit 160 may be a part of charging component 132. In another non-limiting embodiment, battery storage unit 160 may be located in a remote location relative to charging component 132 wherein charging component 132 may charge the battery pack of electric aircraft 152 using the power stored in battery storage unit 160. For instance and without limitation, battery storage unit 160 may be consistent with the battery storage system in U.S. patent application Ser. No. 17/373,863 and titled, "SYSTEM FOR CHARGING FROM AN ELECTRIC VEHICLE CHARGER TO AN ELECTRIC GRID," which is incorporated in its entirety herein. Battery storage unit 160 may contain a plurality of battery cells, a solar inverter, a power grid component, and power distribution panels. Any component of electrical power supply, including electrical storage may include, be included in, share components with, and/or be implemented according to any other electrical power supplies, storage units, or the like as described in this disclosure.

With continued reference to FIG. 1, charging component 132 and/or housing of connector may include fastener 144. As used in this disclosure, a "fastener" is a physical component that is designed and/or configured to attach or fasten two (or more) components together. Charging component 132 may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 5M DUAL LOCK fasteners manufactured by 5M Company of Saint Paul, Minnesota. Press-fastener may also include adhesives, including reusable gel adhesives, GECKSKIN adhesives developed by the University of Massachusetts in Amherst, of Amherst, Massachusetts, or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferro-magnetic material, and/or an electromagnet. Fastener 144 may be configured to provide removable attachment between charging component 132 and at least a port, for example electric aircraft port 156. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 1, charging component 132 may include a charger. A "charger," for the purposes of this disclosure, refers to an electric device that serves as a medium to provide electricity to a battery by a charge connection. The charger may include, but not limited to, a constant voltage charger, a constant current charger, a taper current charger, a pulsed current charger, a negative pulse charger, a dumb charger, a fast charger, a smart charger, an IUI charger, a bidirectional charger, a trickle charger and/or a float charger. In a non-limiting embodiment, a recharging station may be configured to support bidirectional charging as a function of the charger. Bidirectional charging may include the transfer of electrical energy that goes two ways: from an electric grid to an EV battery or from an EV battery to an electric grid. In a non-limiting embodiment, charging station may perform bidirectional charging via the connection between charging component 132 and electric aircraft port 156. In a non-limiting embodiment, charging station may automatically connect the charger to electric aircraft port 156. In a non-limiting embodiment, the charger is mechanically coupled to a docking terminal and protruded outward for a user to manually adjust and connect to electric aircraft port 156 of electric aircraft 152. In a non-limiting embodiment, the charger may lock itself via the charging station if the connection between electric aircraft 152 and charging component 132 is not formed or detected. For instance, the charger may be configured to remain locked and unusable unless an electric aircraft nearby requires charging and forms a charge connection. In a non-limiting embodiment, the charger may be unlocked to allow for use in the charging of an electric aircraft or the receiving of electric power from the electric aircraft when a charge connection is detected and/or formed. In a non-limiting embodiment, charger may incorporate a timer that is configured to allow for an electric aircraft to use the charger for the duration of the timer. For instance, once a charge connection is detected and/or formed and the electric aircraft is physically linked with the charger, a timer may begin to countdown in which the aircraft may utilize the charger before the timer runs out and the charger becomes locked. A person of ordinary skill in the art, after viewing the entirety of this disclosure, would appreciate the various charging capabilities that may be conducted.

With continued reference to FIG. 1, charging component 132 may include a power converter. As used in this disclosure, a "power converter" is an electrical system and/or circuit that converts electrical energy from one form to another. For example, in some cases power converter may convert alternating current to direct current, and/or direct current to alternating current. In some cases, power converter may convert electrical energy having a first potential to a second potential. Alternative or additionally, in some cases, power converter may convert electrical energy having a first flow (i.e., current) to a second flow. As used in this disclosure, an "alternating current to direct current converter" is an electrical component that is configured to convert alternating current to digital current. An alternating current to direct current (AC-DC) converter may include an alternating current to direct current power supply and/or transformer. In some cases, the AC-DC converter may be located within an electric aircraft 104 and conductors may provide an alternating current to the electric aircraft by way of at least a charger. Alternatively and/or additionally, in some cases, AC-DC converter may be located outside of electric vehicle and an electrical charging current may be provided as a direct current to electric aircraft 152, by way of at least a charger. In some cases, AC-DC converter may be used to recharge the battery pack of electric aircraft 152. In some embodiments, power converter may have a connection to a grid power component, for example by way of at least a charger. Grid power component may be connected to an external electrical power grid. In some embodiments, grid power component may be configured to slowly charge one or more batteries in order to reduce strain on nearby electrical power grids. In one embodiment, grid power component may have an AC grid current of at least 250 amps. In some embodiments, grid power component may have an AC grid current of more or less than 250 amps. In one embodiment, grid power component may have an AC voltage connection of 280 Vac. In other embodiments, grid power component may have an AC voltage connection of above or below 280 Vac. In some embodiments, charging station may provide power to the grid power component by the electric energy stored in its own battery pack of charging component 132 or the battery pack of an electric aircraft. In this configuration, charging station may provide power to a surrounding electrical power grid.

With continued reference to FIG. 1, in some cases, the power converter may include one or more direct current to direct current (DC-DC) converters. DC-DC converters may include without limitation any of a linear regulator, a voltage regulator, a motor-generator, a rotary converter, and/or a switched-mode power supply. In some cases, power converter may include a direct current to alternating current (DC-AC) converter. DC-AC converters may include without limitation any of a power inverter, a motor-generator, a rotary converter, and/or a switched-mode power supply. In some cases, power converter may include one or more alternating current to direct current (AC-DC) converters. AC-DC converters may include without limitation any of a rectifier, a mains power supply unit (PSU), a motor-generator, a rotary converter, and/or a switched-mode power supply. In some cases, power converter may include one or more alternating current to alternating current (AC-AC) converters. AC-AC converters may include any of a transformer, autotransformer, a voltage converter, a voltage regulator, a cycloconverter, a variable-frequency transformer, a motor-generator, a rotary converter, and/or a switched-mode power supply. In some cases, power converter may provide electrical isolation between two or more electrical circuits, for example battery pack 116 and charger. In some cases, power converter may provide a potential (i.e., voltage) step-down or step-up. In some embodiments, power converter may receive an alternating current and output a direct current. In some embodiments, power converter may receive a potential within a range of about 100 Volts to about 500 Volts. In some embodiments, power converter may output a potential within a range of about 200 Volts to about 600 Volts. In some embodiments, power converter may receive a first potential and output a second potential at least as high as the first potential. In some embodiments, power converter may be configured to receive a first current from a power source including a "Level 2" charger, such that the first current consists of an alternating current having a potential of about 240 Volts or about 120 Volts and a maximum current no greater than about 30 Amps or no greater than about 20 Amps. In some embodiments, power converter may be configured to output a second current which is comparable to that output by a "Level 5" charger, such that the second current consists of a direct current having a potential in a range between about 200 Volts and about 600 Volts.

With continued reference to FIG. 1, charging component 132 may include one or more conductors configured to conduct, for example, a direct current (DC) or an alternating current (AC), and the like thereof. In a non-limiting embodiment, the conductor may be configured to charge or recharge, for example, the battery pack of the electric aircraft. As used in this disclosure, a "conductor" is a component that facilitates conduction. As used in this disclosure, "conduction" is a process by which one or more of heat and/or electricity is transmitted through a substance, for example when there is a difference of effort (i.e., temperature or electrical potential) between adjoining regions. In some cases, a conductor may be configured to charge and/or recharge an electric vehicle. For instance, conductor may be connected to the battery pack of electric aircraft 152 and/or battery storage unit 160 of charging component 132. The conductor may be designed and/or configured to facilitate a specified amount of electrical power, current, or current type. For example, a conductor may include a direct current conductor. As used in this disclosure, a "direct current conductor" is a conductor configured to carry a direct current for recharging the battery pack of electric aircraft 152. As used in this disclosure, "direct current" is one-directional flow of electric charge. In some cases, a conductor may include an alternating current conductor. As used in this disclosure, an "alternating current conductor" is a conductor configured to carry an alternating current for recharging the battery pack of electric aircraft 152. As used in this disclosure, an "alternating current" is a flow of electric charge that periodically reverse direction; in some cases, an alternating current may change its magnitude continuously with in time (e.g., sine wave). In a non-limiting embodiment, charging component 132 may include a ground conductor. A "ground conductor," for the purpose of this disclosure, is a conductor or a system or that is intentionally grounded. In a non-limiting embodiment, the ground conductor may include any suitable conductor configured to be in electrical communication with a ground. In a non-limiting embodiment, a ground is a reference point in an electrical circuit, a common return path for electric current, or a direct physical connection to the earth. The ground may include an absolute ground such as earth or ground may include a relative (or reference) ground, for example in a floating configuration. The ground conductor functions to provide a grounding or earthing path for any abnormal, excess or stray electricity. In a non-limiting embodiment, charging component 132 may include a control signal conductor configured to conduct a control signal. A "control signal conductor," for the purpose of this disclosure, is a conductor configured to carry a control signal between charging component 132 and computing device 112. The control signal is an electrical signal that is indicative of information. The control signal may include, for example, an analog signal, a digital signal, or the like.

With continued reference to FIG. 1, charging component 132 may include a proximity signal conductor. As used in this disclosure, an "proximity signal conductor" is a conductor configured to carry a proximity signal. As used in this disclosure, a "proximity signal" is a signal that is indicative of information about a location of connector. In a non-limiting embodiment, charging component 132 may be coupled to the proximity signal conductor. The proximity signal may be indicative of attachment of connector with a port, for instance electric vehicle port. In some cases, a proximity signal may include an analog signal, a digital signal, an electrical signal, an optical signal, a fluidic signal, or the like. In embodiments, a proximity signal conductor may be configured to conduct a proximity signal indicative of attachment between connector and an electric vehicle port. In one or more non-limiting exemplary embodiments, computing device 112 may be configured to receive charging datum including a proximity signal from sensor 108, which may include a proximity sensor. The proximity sensor may be electrically communicative with a proximity signal conductor. The proximity sensor may be configured to generate a proximity signal as a function of connection between connector and electric vehicle port. As used in this disclosure, a "proximity sensor" is a sensor that is configured to detect at least a phenomenon related to connecter being mated to a port. The proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In one or more non-limiting exemplary embodiments, if computing device 112 determines a disruption element as a function of proximity charging datum, then computing device 112 may disable a charging connection, such as turn off a power supply to the charger and thus turn off a power supply to electric aircraft 152.

With continued reference to FIG. 1, charging component 132 may include a coolant flow path. In a non-limiting embodiment, the coolant flow path may have a distal end located substantially at charging component 132. As used in this disclosure, a "coolant flow path" is a component that is substantially impermeable to a coolant and contains and/or directs a coolant flow. As used in this disclosure, "coolant" may include any flowable heat transfer medium. In a non-limiting embodiment, the coolant may include a liquid, a gas, a solid, and/or a fluid. The coolant may include a compressible fluid and/or a non-compressible fluid. The coolant may include a non-electrically conductive liquid such as a fluorocarbon-based fluid, such as without limitation Fluorinert™ from 3M of Saint Paul, Minnesota, USA. In some cases, coolant may include air. As used in this disclosure, a "flow of coolant" is a stream of coolant. In some cases, coolant may include a fluid and coolant flow is a fluid flow. Alternatively or additionally, in some cases, coolant may include a solid (e.g., bulk material) and coolant flow may include motion of the solid. Exemplary forms of mechanical motion for bulk materials include fluidized flow, augers, conveyors, slumping, sliding, rolling, and the like. The coolant flow path may be in fluidic communication with coolant source 140. As used in this disclosure, a "coolant source" is an origin, generator, reservoir, or flow producer of coolant. In some cases, coolant source 140 may include a flow producer, such as a fan and/or a pump. Coolant source 140 may include any of following non-limiting examples, air conditioner, refrigerator, heat exchanger, pump, fan, expansion valve, and the like.

Still referring to FIG. 1, in some embodiments, coolant source 140 may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source comprises a heart transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like. In some versions, computing device 112 may be further configured to control a temperature of coolant. For instance, in some cases, a sensor may be located within thermal communication with coolant, such that sensor is able to detect, measure, or otherwise quantify temperature of coolant within a certain acceptable level of precision. In some cases, sensor may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to charging connector 112. Computing device 112 may receive coolant temperature charging datum and determine if there is a disruption element as a function of the coolant temperature charging datum. If computing device 112 determines such a charging datum, computing device 112 may disable charging connection by, for example, turning off coolant flow through connector. Computing device 112 may use any control method and/or algorithm used in this disclosure to control charging component 132, including without limitation proportional control, proportional-integral control, proportional-integral-derivative control, and the like.

Still referring to FIG. 1, charging component 132 may include ventilation component 136. Ventilation component 136 may be configured to lead a flow of air and/or airborne particles away from charging component 132 and/or electric aircraft 152. In some embodiments, ventilation component 136 may include a ventilation ducting system. A "ventilation component" as used in this disclosure is a group of holes configured to permit a flow of air away or towards an object. In some embodiments, a ventilation ducting system may be configured to direct a flow of heated air away from charging component 132. In other embodiments, a ventilation ducting system may be configured to direct a flow of cool air to charging component 132. In some embodiments, ventilation component 136 may include a plurality of exhaust devices, such as, but not limited to, vanes, blades, rotors, impellers, and the like. In some embodiments, an exhaust device of ventilation component 136 may be mechanically connected to a power source. In one or more embodiments, ventilation component 136 may have a charging connection with electric aircraft 152. In one or more exemplary embodiments, if computing device 112 determines a disruption element related to the communication between ventilation component 136 and electric aircraft 152 as a function of, for example, temperature charging datum, then computing device 112 may disable charging connection between ventilation component 136 and electric aircraft 152 to avoid, for example, overheating of charging component 132 and/or electric aircraft 152 if ventilation component 136 is working improperly.

With continued reference to FIG. 1, charging component 132 may include thermal overload relay 148. A "thermal overload relay," for the purpose of this disclosure, is an economic electromechanical protection device for an electrical device such as charging component 132. In a non-limiting embodiment, thermal overload relay 148 may include a coaxial relay, contactor, force-guided contacts relay, latching relay, machine tool relay, mercury relay, multi-voltage relay, overload protection relay, polarized relay, reed relay, safety relay, solid-state relay, static relay, time delay relay, vacuum relay, and the like thereof. In a non-limiting embodiment, thermal overload relay 148 may be configured to protect the any electrical device described herein from damage in the event of a short circuit, or being over-loaded and overheating. For example and without limitation, thermal overload relay 148 may be activated by heat caused from high current flowing through the overload and over a bimetallic strip. In a non-limiting embodiment, thermal overload relay 146 may offer reliable protection for charging component 132 and its components in the event of thermal overload or phase failure. A "thermal overload," for the purpose of this disclosure, is any excessive increase in thermal energy of an electrical device. In a non-limiting embodiment, a thermal overload may occur in the event a battery pack is charged too quickly or charged too much. A "phase failure," for the purpose of this disclosure, is any of the phases that supply the any electric device are disconnected. For example and without limitation, the phase failure may occur as a function of a loss of one or more phases in a charging process. In another non-limiting example, the phase failure may occur in the event any of component of electric aircraft 152 and/or charging component 132 such as, but not limited to, the charging connector and any cables are damaged. In a non-limiting embodiment, thermal overload relay 148 may be coupled to charging component 132 and configure to protect its components such as battery storage unit 160. In another non-limiting embodiment, thermal overload relay 148 may be coupled to electric aircraft 152 in the event a charging connection has been established via charging component 132 and/or the charging connector and configured to protect the electric aircraft in the event of a thermal overload or phase failure. In a non-limiting embodiment, thermal overload relay 148 may be configured to cut power if the motor draws too much current for an extended period of time. In a non-limiting embodiment, causes of a thermal overload may include a large change in load (e.g., a scrap grinder is fed too much at a time), misalignment, a broken drive gear, or improper motor drive settings. Power problems (e.g., low voltage or low power factor) also may cause an overload condition. In a non-limiting embodiment, thermal overload relay 148 may be wired in series with charging component 132 and/or electric aircraft 152, so the current flowing to the motor also flows through thermal overload relay 148. When the current reaches or exceeds a predetermined limit for a certain amount of time, the relay activates a mechanism that opens one or more contacts to interrupt current flow to the motor. In a non-limiting embodiment, thermal overload relay 148 may be rated by their trip class, which defines the amount of time for which the overload can occur before the relay responds, or trips. For example and without limitation, common trip classes are 5, 10, 20, and 30 seconds. Taking time, as well as current, into account is important for AC induction motors because they draw significantly more than their full rated current (often 600 percent or more) during startup. So if the relay tripped immediately when the overload current was exceeded, the motor would have difficulty starting.

With continued reference to FIG. 1, sensor 104 may be configured to transmit any datum detected such as, but not limited to, sensor datum 108, to computing device 112. In a non-limiting embodiment, computing device 112 may be connected to a network. A "network, for the purpose of this disclosure, is any medium configured to facilitate communication between two or more devices. The network may include, but not limited to, an artificial neural network, wireless network, radio network, electrical network, broadcast network, and the like thereof. In a non-limiting embodiment, the network may be a public network in which any electric aircraft that may fly within its range may be informed of the recharging station. In another non-limiting embodiment, a plurality of electric aircrafts that fly within the range of the network may be aware of each other's location and communicate via the network using any means of connection such as Wi-Fi, Bluetooth, radio transmission, and the like thereof. In a non-limiting embodiment, the network may be a private network in which the electric aircraft must request access to connect to the network and access the recharging station or other electric aircrafts that are within the network. In a non-limiting embodiment, the network may include a mesh network. The mesh network may include an avionic mesh network. The mesh network may include, without limitation, an avionic mesh network. For instance and without limitation, the avionic mesh network may be consistent with the avionic mesh network in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some embodiments, the network may include an intra-aircraft network and/or an inter-aircraft network. Intra-aircraft network may include any intra-aircraft network described in this disclosure. Inter-aircraft network may include any inter-aircraft network described in this disclosure. In some cases, the network may communicate encrypted data. As used in this disclosure, "encrypted data" is any communicable information that is protected or secured by any method, including obfuscation, encryption, and the like. Encrypted data may include information protected by any cryptographic method described in this disclosure. In some embodiments, the network may include an intra-aircraft network and/or an inter-aircraft network. Intra-aircraft network may include any intra-aircraft network described in this disclosure. Inter-aircraft network may include any inter-aircraft network described in this disclosure. In a non-limiting embodiment, computing device 112 may receive datum from an airborne electric aircraft that is connected to the network and/or within the range of the network. For example and without limitation, electric aircraft 152 that comes within the range of the network may digitally transmit data about the aircraft and its battery recharging needs. This is so, at least in part, for computing device 112 to generate disconnection protocol 120 in advance before the occurrence of disruption element 116. Persons skilled in the art, upon reviewing the entirety of this disclosure, will be aware of the various digital communication and transmissions used for the purpose described herein.

With continued reference to FIG. 1, computing device 112 may receive and/or detect a plurality of information regarding one or more electric aircrafts in the sky that are within the network's radius. For example and without limitation, sensor 104 may capture information from any electric aircraft that comes within the range of the network in which computing device 112 may permit the transfer of data between computing device 112 and the electric aircraft. In a non-limiting example, the data may include a request to descend and receive recharging. Computing device 112 may authenticate electric aircraft 152. In a non-limiting embodiment, once electric aircraft 152 is in range of the network, electric aircraft 152 may request to recharge and/or computing device 112 may verify electric aircraft 152 in which recharging may be permitted. In a non-limiting embodiment, computing device 112 may authenticate any electric aircraft such as electric aircraft 152 which may come within the reach of the network using an authentication module. An "authentication module," for the purpose of this disclosure, is a hardware and/or software module configured to authenticate an electric aircraft. In a non-limiting embodiment, once computing device 112 has established a connection with electric aircraft 152, via the network or any radio frequency or Bluetooth connection. In a non-limiting embodiment, authentication may be performed automatically via the authentication module. In a non-limiting embodiment, authentication may be performed manually between operators of both devices through radio transmissions. Persons skilled in the art, upon reviewing the entirety of this disclosure, will be aware of the various purposes and methods of authenticating a second party as disclosed in the entirety of this disclosure.

With continued reference to FIG. 1, computing device 112 may be configured to determine disruption element 116 as a function of sensor datum 108. For purposes of this disclosure, a "disruption element" is an element of information regarding a present-time failure, fault, or degradation of a condition or working order of a charging connection and/or components of a charging component or electric aircraft. In one or more embodiments, disruption element 116 may be determined as a function of sensor datum 108, as discussed further in this disclosure. In some embodiments, computing device 112 may be configured to disable any charging connection based on disruption element 116. In a non-limiting embodiment, disruption element 116 may denote any disconnection between charging component 132 and electric aircraft 152. For example, and without limitation, the disconnection may include any electrical disconnection and/or mechanical disconnection. For instance, and without limitation, disruption element may include a disconnection that includes a loss of communication between connector and electric aircraft. In a non-limiting embodiment, disruption element 116 may include the presence of one or more unsecure connection, wherein the unsecure connection may include a loose and/or faulty connection. For example, and without limitation, the connection may include a coupling of a charging port attached to electric aircraft 152 such as electric aircraft port 156 and charging component 132. In another non-limiting embodiment, disruption element 116, may include a null connection. A "null connection," for the purpose of this disclosure, is any connection that was inappropriately disabled. "Inappropriately disabled," for the purpose of this disclosure, is a disabling of any component involved in a charging process that is unsafe, unsuccessful, or unauthorized. For example, and without limitation, an inappropriately disabled connection may include turning off the charging system and/or charging component 132 at an incorrect time, such as in the middle of a charging process. In another non-limiting example, an inappropriate disabling of any connection may include an unexpected disconnection of any connector. In one or more embodiments, a null connection may include a disconnection that has occurred after the detection of an unauthorized charge, where an unauthorized charge comprises an unauthorized electric aircraft being supplied electrical power by charging component. This may include physically detaching a connector quickly, unsuccessfully detaching every component of a connector resulting in a loose connection, and the like thereof. A "disconnection," for the purpose of this disclosure, is any detachment of any electrical, physical, or communicative connection associated with the charging process as described herein. For example, and without limitation, the null connection may denote that charging component 132 that was once secured to electric aircraft port 156 is no longer secured. In another non-limiting example, the null connection may be identified as a function of charging component 132 no longer supplying one or more electrical currents and/or energies to the battery pack of electric aircraft 152. In another non-limiting example, the null connection may be identified as a function of battery storage unit 160 no longer supplying one or more electrical currents and/or energies to the charging component 132. Persons skilled in the art, upon reviewing the entirety of this disclosure, will be aware of the various embodiments of a disconnection for purposes as described herein.

Still referring to FIG. 1, disruption element 116 may include an undesirable health status of a flight component, as previously discussed in this disclosure. For example, and without limitation, a disruption element may include a condition status of a flight component of electric aircraft 156 that is "unoperational", where the flight component does not function as intended and negatively affects the operation of electric aircraft 152 (e.g., making electric aircraft unsafe to handle during one or more stages of flight).

With continued reference to FIG. 1, in one or more embodiments, if disconnection protocol 120 such as an immediate shutdown via a disablement of the charging connection is initiated, then computing device 112 may also generate a signal to notify users, support personnel, safety personnel, flight crew, maintainers, operators, emergency personnel, aircraft computers, or a combination thereof. System 100 may include a display. A display may be coupled to electric aircraft 152, The charging component 132, or a remote device. A display may be configured to show a disruption element to a user. In one or more embodiments, computing device 112 may be configured to disable the charging connection based on disruption element 116. For instance, and without limitation, computing device 112 may be configured to detect a charge reduction event, defined for purposes of this disclosure as any temporary or permanent state of a battery cell requiring reduction or cessation of charging. A charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature of the cell above a preconfigured threshold, detection of a voltage and/or resistance level above or below a preconfigured threshold, or the like.

With continued reference to FIG. 1, on one or more embodiments, computing device 112 may be configured to control one or more electrical charging current within a conductor and/or coolant flow within a hose of charging component 132. In one or more embodiments, computing device 112 may be a controller. As used in this disclosure, a "controller" is a logic circuit, such as an application-specific integrated circuit (ASIC), FPGA, comparator, Op-amp current source circuit, microcontroller, computing device, any combination thereof, and the like, that is configured to control a system and/or subsystem. For example, controller may be configured to control coolant source 140, a ventilation component 136, battery storage unit 160, thermal overload relay 148, and/or any other charger component. In some embodiments, controller may control coolant source 140 and/or battery storage unit 160 according to the disconnection protocol 120. In some embodiments, the disconnection protocol 120 may be analog. In some cases, the disconnection protocol 120 may be digital. In one or more embodiments, the disconnection protocol 120 may be communicated according to one or more communication protocols, for example without limitation Ethernet, universal asynchronous receiver-transmitter, and the like. In some cases, the disconnection protocol 120 may be a serial signal. In some cases, disconnection protocol 120 may be a parallel signal. Disconnection protocol 120 may be communicated by way of a network, for example a controller area network (CAN). In some cases, the disconnection protocol 120 may include commands to operate one or more of coolant source 140s 148, ventilation components 152, and/or battery storage unit 160. For example, and without limitation, coolant source 140 may include a valve to control coolant flow and computing device 112 may be configured to control the valve by way of the disconnection protocol 120. In some cases, coolant source 140 may include a flow source (e.g., a pump, a fan, or the like) and computing device 112 may be configured to control the flow source by way of disconnection protocol 120. For example, and without limitation, computing device 112 may turn off a flow source of charging component 132 via the disconnection protocol 120. In some case, battery storage unit 160 may include one or more circuits configured to provide a variable current source to provide electric charging current, for example, an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In one or more embodiments, one or more circuits within charging component 132 or within communication with charging component 132 are configured to affect electrical charging current according to disruption element 140 from computing device 112, such that computing device 112 may control at least a parameter of the electrical charging current, such as an ON and OFF of circuits. For instance, and without limitation, computing device 112 may control one or more of current (Amps), potential (Volts), and/or power (Watts) of electrical charging current by way of the disruption command. For example, computing device 112 may be configured to selectively engage electrical charging current, for example, ON or OFF by way of the disruption command. In one or more embodiments, computing device 112 is configured to provide protection to prevent damage to electric aircraft 152, charging component 132, and/or injury to personnel by providing an immediate shutdown, such as an emergency shutdown, of the charging connection. For example, in some cases, computing device 112 may be configured to start and/or stop coolant flow and/or charging current under normal and/or abnormal conditions. In some cases, computing device 112 may include a user interface. User interface may allow personnel to interface with computing device 112 and thereby control any system and/or subsystem of charging component 132, including but not limited to coolant source 140 and charger power source 140. In some cases, user interface may be configured to communicate information, such as without limitation charging data and/or disruption element to personnel. For example, and without limitation, user interface may provide indications when charging component 132 needs servicing after computing device 112 has transmitted disconnection protocol 120.

With continued reference to FIG. 1, computing device may be configured to generate disconnection protocol 120 as a function of disruption element 116. In a non-limiting embodiment, computing device may be configured to initiate disconnection protocol 120 as a function of disruption element 116 and/or timer module 124. In one or more embodiments, disruption element 116 may indicate a battery pack of electric aircraft 152 and/or battery storage unit 160 of charging component 132, is operating outside of an acceptable operation condition represented by a threshold. For the purposes of this disclosure, a "threshold" is a set desired range and/or value that, if exceeded by a value of sensor datum 108, initiates a specific reaction of computing device 112. A specific reaction may be, for example, a disconnection protocol 120, which is discussed further below in this disclosure. The threshold may be set by, for example, a user or computing device 112 based on, for example, prior use or an input. In one or more embodiments, if sensor datum 108 is determined to be outside of a threshold, disruption element 116 is determined by computing device 112 and the disconnection protocol 120 is generated. For example, and without limitation, sensor datum 108 may indicate that the battery pack of electric aircraft 152 and/or battery storage unit 160 of charging component 132 has a temperature of 100° F. Such a temperature may be outside of a preconfigured threshold of, for example, 75° F. of an operational condition, such as temperature, of a power source and thus the charging connection may be disabled by computing device 112 to prevent overheating of and/or permanent damage to the battery pack of electric aircraft 152 and/or battery storage unit 160. For the purposes of this disclosure, a "disconnection protocol" is a signal transmitted to charging component 132 in a response to disruption element 116 that provides instructions and/or a command to disable and/or terminate a charging connection between electric aircraft 152 and charging component 132. In one or more embodiments, disconnection protocol 120 may include a de-energizing protocol. For the purposes of this disclosure a "de-energizing protocol" is a process of termination of electric power flow through conductors of a charging component. For example, and without limitation, a de-energizing protocol may include instructions that power off a power source of charging component 132 so that electrical power no longer flows through one or more conductors of charging component. Thus, in one or more embodiments, de-energizing protocol may terminate a flow of electrical power through conductors and pins of connector of charging component 132 and prevents and exchange of power between charging component 132 and electric aircraft 152 despite physical contact between charging component 132 and electric aircraft 152 still being established. In one or more non-limiting exemplary embodiments, when de-energizing protocol is initiated, proximity pins of connector may indicate that connector is installed in port 156, however, no electric power will be detected by, for example, and electrical sensor. For the purposes of this disclosure, "de-energizing" is the termination of a supplying of power or the ceasing of a flow of electrical power. For instance, and without limitation, deenergizing may include the shutting off of a power supply. "Initiating" a protocol, for the purpose of this disclosure, is transmitting a signal to triggering the process of disconnection protocol 120, including one or more instructions for the completion and/or execution of the process. For example, and without limitation, disconnection protocol 120 may eliminate one or more secure connections, unsecure connections, loose connections, faulty connections, and the like thereof by any means of disconnection. In a non-limiting example, disconnection protocol 120 may include one or more physical disconnections such as removing one or more charging connectors and/or plugs from any port. In another non-limiting example, disconnection protocol 120 may include one or more electrical disconnections such as eliminating one or more circuits and/or current feeds from the charging connector, electric aircraft port 156, charging component 132, and/or electric aircraft 152. For example and without limitation, disconnection protocol 120 may include ejecting any cable, connector, and/or connecting component from the side of charging component 132. In another non-limiting example, disconnection protocol 120 may include eliminating any connection automatically. For example and without limitation, charging component 132 may include ejectors, clamps, splices, couplers, rebars, springs, etc., configured to detach charging component 132 from electric aircraft port 156. In another non-limiting example, computing device 112 may send electrical signals to control any mechanical and/or electrical component (e.g. ejectors, clamps, splices, couplers, rebars, springs, fastener, etc.) in the event disconnection protocol 120 is initiated. Computing device 112 may automatically disconnect as a function of an expiration of a timer from timer module 124. Disconnection protocol 120 may include disabling and/or disconnecting any electrical connection associated with charging, wherein disabling may include disabling the charging connection, terminating a communication between electric aircraft 152 and charging component 132. An "electrical connection," for the purpose of this disclosure, is a joining of electrical devices to create an electrical circuit. In a non-limiting embodiment, disconnecting an electrical connection may include disabling power to charging component 132 and/or disabling any connection from battery storage unit 160 that is used to power charging component 132. In another non-limiting embodiment, disconnecting an electrical connection may include disabling a port of a cable from charging component 132. Disconnection protocol 120 may include disabling and/or disconnecting any mechanical connection associated with charging. A "mechanical connection," for the purpose of this disclosure, for the purpose of this disclosure, is a joining of mechanical components to transfer forces between each other. In a non-limiting embodiment, disconnecting a mechanical connection may include unfastening by fastener 144 any connector that may be connected to electric aircraft port 156. In another non-limiting embodiment, disconnecting a mechanical connection may include disconnecting ejecting any connector of charging component 132 from electric aircraft port 156. In a non-limiting embodiment, disabling the charging connection may include terminating a power supply to charging component 132 so that charging component 132 is no longer providing power to electrical aircraft 152. In another example, and without limitation, disabling the charging connection may include terminating a power supply to electric aircraft 152. In another example, and without limitation, disabling the charging connection may include using a relay or switch between charging component 132 and electric aircraft 152 to terminate charging connection and the charging of between charging component 132 and electric aircraft 152.

With continued reference to FIG. 1, in some embodiments, charging component 132 may include a connector configured to connect to port of electric aircraft 152 to create a charging connection. In such a case, connector of charging component 132 may be configured to be in electric communication and/or mechanic communication with port of electric aircraft 152. In other embodiments, the charging connection between charging component 132 and electric aircraft 152 may be wireless, such as via induction for an electric communication or via wireless signals for an informatic communication. In other embodiments, a hose of charging component 132 may be configured to be in fluidic communication with electric aircraft port 156. For example, and without limitation, hose may facilitate fluidic communication between coolant source 140 and the battery pack of electric aircraft 152 when connector is connected to electric aircraft port 156. In one or more embodiments, coolant source 140 may pre-condition the battery pack of electric aircraft 152. As used in this disclosure, "pre-conditioning" is an act of affecting a characteristic of a power source, for example power source temperature, pressure, humidity, swell, and the like, substantially prior to charging. In some cases, coolant source 140 may be configured to pre-condition the battery pack of electric aircraft 152 prior to charging, by providing a coolant flow to the power source of the electric vehicle and raising and/or lowering temperature of the power source. Connector of charging component 132 may include a seal configured to seal coolant. In some cases, seal may include at least one of a gasket, an O-ring, a mechanical fit (e.g., press fit or interference fit), and the like. In one or more embodiments, sensor 108 may detect a charging characteristic of seal. For example, and without limitation, if seal is leaking coolant, sensor 104 may detect a pressure charging characteristic, generate a sensor datum 108 related to the detected pressure, and transmit sensor datum 108 to computing device 112. Computing device 112 may then determine a disruption element as a function of the pressure sensor datum 108 and a preconfigured pressure threshold for coolant flow. Sensor datum 108 may be determined to be outside of preconfigured threshold and thus computing device 112 may disable charging connection as a safety measure, such as by shutting off coolant flow through hose.

With continued reference to FIG. 1, computing device 12 may incorporate a timer module 124 to generate disconnection protocol 120 based on disruption element 116. A "timer module," for the purpose of this disclosure, is a timing device configured to track the time taken of an occurrence or countdown in the event of an occurrence. In a non-limiting embodiment, timer module 124 may include an oscillator such as a crystal oscillator or cesium oscillator, wherein the oscillator may be configured to generate and/or use a clock signal. Timer module 124 may include a counter, wherein the counter is configured to count the number of instances of, but not limited to, rising edges, falling edges, and/or changes of a clock signal, and the like thereof. In a non-limiting example, disruption element 116 may include an improper connection between charging component 132 and electric aircraft port 156, in which sensor 104 detects the improper connection. The connection may be established as a function of a human operator or automated operator. In a non-limiting embodiment, disruption element 116 may include a minor improper connection wherein no potential risk of damage to any component is present, wherein computing device 112 may generate disconnection protocol 120 using timer module 124, wherein timer module may start a timer of 30 seconds until disconnection protocol 120 is initiated. The 30 seconds is provided in order to give an operator ample time to fix the improper connection. In the event disruption element 116 is not resolved by the time the timer of timer module 124 expires, computing device 112 may initiate disconnection protocol 120, which may include emergency protocol 128. An "emergency protocol," for the purpose of this disclosure, is an immediate shutting down of charging related electrical components. In a non-limiting embodiment, emergency protocol 128 may include the activation of a siren or alert to indicate a priority situation to be resolved. In a non-limiting embodiment, emergency protocol 128 may include electrically disabling all components of charging component 132. For example and without limitation, computing device 112 may immediately shut down all charging processes in the event emergency protocol 128 is initiated. Persons skilled in the art, upon reviewing the entirety of this disclosure, will be aware of the various severity of emergencies and protocols designed to respond to them for purposes as described herein.

With continued reference to FIG. 1, disconnection protocol 120 may include a set of instructions that an operator or a plurality of operators may undertake to resolve disruption element 116. For example and without limitation, disconnection protocol 120 may include disconnecting all ports associated with charging between electric aircraft 152 and charging component 132, by means of physical human maneuvers. In the event such measures are not undertaken or not undertaken within a specific time limit set by timer module 124, emergency protocol 128 may be initiated, wherein any charging connectors are blocked by any locking mechanism within charging component 132. In a non-limiting embodiment, the locking mechanism may be controlled as a function of a safety lock instruction which may be a part of disconnection protocol 120. A "safety lock instruction," for the purpose of this disclosure, is a safety feature and an operational direction or implementation for charging component 132 and any locking mechanism it may have. In a non-limiting embodiment, the safety lock instruction may include a feature that may control, whether or not charging (or current flow) should be enabled, disabled, modified, regulated, or the like. For example and without limitation, the safety lock instruction include an initial security measure to verify a physical connection between charging component 132 and electric aircraft 152 and/or electric aircraft port 156 is established. In another non-limiting example, the safety lock instruction may include a feature that ensures no current flow is occurring between charging component 132 and electric aircraft 152 or electric aircraft port 156. The safety lock instruction may include specific instructions that may instruct any locking mechanism within charging component 132 to block any transfer of electrical energy between charging component 132 and electric aircraft 152. For example and without limitation, the safety lock instruction may include instructions for computing device 112 and/or charging component 132, which may be electrically connected with computing device 112, to lock fastener 144 to ensure no flow of electrical energy is occurring as long as charging component 132 is not mated with electric aircraft 152 and/or electric aircraft port 156. In a non-limiting embodiment, computing device 112 and/or charging component 132 may unlock fastener 144 to ensures that there is a flow of electrical energy between charging component 132 and electric aircraft port 156. In a non-limiting embodiment, the safety lock instruction may include a feature that ensure fastener 144 fastener is locked indefinitely without interruption, until the performance of the charging instruction is complete. In another non-limiting example, the safety lock instruction may include unlocking fastener 144 in order to disconnect any charging connectors and/or cables from charging component 132 and/or electric aircraft port 156. Persons skilled in the art, upon reviewing the entirety of this disclosure, will be aware of the various safety features for controlling a fastener for purposes as described herein.

With continued reference to FIG. 1, a charging connection may be interrupted abruptly by an outside factor such as a user or an accident, wherein computing device 112 may initiate emergency protocol 128. This may include executing a safety lock instruction on charging component 132. For example and without limitation, charging component 132 may detach itself from electric aircraft port 156 by any method of ejections on any charging connector and/or cable. In a non-limiting embodiment, charging component 132 may include clips or springs used to hold onto a charging connector securely onto electric aircraft port 156 using clips or eject the charging connector immediately using springs, which may be unlocked by fastener 144. Persons skilled in the art, upon reviewing the entirety of this disclosure, will be aware of the various embodiments of detaching for purposes as described herein.

With continued reference to FIG. 1, computing device 112 may train a machine-learning model as a function of the training set. The computing device 112 may be configured to output disruption element 116 as a function of the training set. The training set may correlate any past instances of sensor datum 108 detected from previous instances in which disruption element 116 have been determined and disconnection protocol 120 have been generated/initiated. All instances may be stored in a database wherein computing device 112 may retrieve a training set from. In a non-limiting embodiment, computing device 112 may receive sensor datum 108 and determine the correct disruption element based on the training set that best correlates sensor datum 108 to a disruption element retrieved from the database. The training set may be used as an input for a machine-learning algorithm which may be used by the machine-learning model to output disruption element 116, which is a determination of a disconnection. Persons skilled in the art, upon reviewing the entirety of this disclosure, will be aware of the various embodiments of machine-learning for purposes as described herein.

Figure 2:
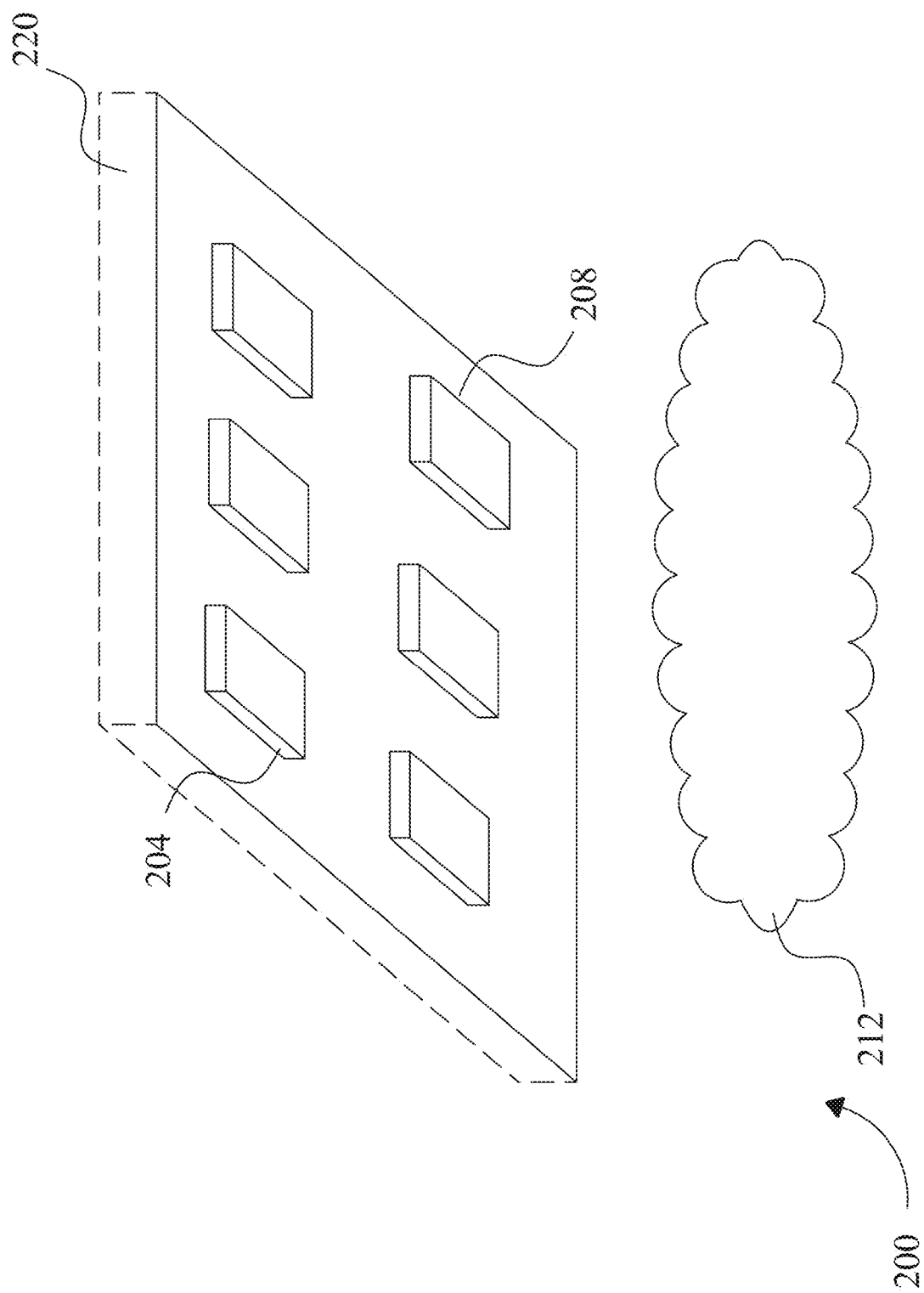
FIG. 2 is a diagrammatic representation of an exemplary embodiment of a sensor suite.

Referring now to FIG. 2, an embodiment of sensor suite 200 is presented in accordance with one or more embodiments of the present disclosure. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors communicatively connected to charging component 132 measuring operating conditions of the communication such as temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 108 to detect phenomenon is maintained.

Sensor suite 200 includes a moisture sensor 204. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 204 may be psychrometer. Moisture sensor 204 may be a hygrometer. Moisture sensor 204 may be configured to act as or include a humidistat. A "humidistat", for the purposes of this disclosure, is a humidity-triggered switch, often used to control another electronic device. Moisture sensor 204 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 2, sensor suite 200 may include electrical sensors 208. Electrical sensors 208 may be configured to measure voltage of charging component 132, electrical current of charging component 132, and resistance of charging component 132. Electrical sensors 208 may include separate sensors to measure each of the previously disclosed electrical characteristics such as voltmeter, ammeter, and ohmmeter, respectively.

Alternatively or additionally, and with continued reference to FIG. 2, sensor suite 200 may include a sensor or plurality thereof that may detect voltage and direct the charging of individual battery cells of a power source according to charge level; detection may be performed using any suitable component, set of components, and/or mechanism for direct or indirect measurement and/or detection of voltage levels, including without limitation comparators, analog to digital converters, any form of voltmeter, or the like. Sensor suite 200 and/or a control circuit incorporated therein and/or communicatively connected thereto may be configured to adjust charge to one or more battery cells as a function of a charge level and/or a detected parameter. For instance, and without limitation, sensor suite 200 may be configured to determine that a charge level of a battery cell of a power source is high based on a detected voltage level of that battery cell or portion of the power source and/or battery pack. Sensor suite 200 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 200 may include digital sensors, analog sensors, or a combination thereof. Sensor suite 200 may include digital-to-analog converters (DAC), analog-to-digital converters (ADC, A/D, A-to-D), a combination thereof, and the like.

With continued reference to FIG. 2, sensor suite 200 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 200, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 2, sensor suite 200 may include a sensor configured to detect gas that may be emitted during or after a cell failure. "Cell failure", for the purposes of this disclosure, refers to a malfunction of a battery cell of a power source, which may be an electrochemical cell, that renders the cell inoperable for its designed function, namely providing electrical energy to at least a portion of an electric aircraft. Byproducts of cell failure 212 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 200, may be configured to detect combustible, flammable, toxic, oxygen depleted, a combination thereof, or another type of gas alone or in combination. The gas sensor that may be present in sensor suite 200 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 200 may include sensors that are configured to detect non-gaseous byproducts of cell failure 212 including, in non-limiting examples, liquid chemical leaks including aqueous alkaline solution, ionomer, molten phosphoric acid, liquid electrolytes with redox shuttle and ionomer, and salt water, among others. Sensor suite 200 may include sensors that are configured to detect non-gaseous byproducts of cell failure 212 including, in non-limiting examples, electrical anomalies as detected by any of the previous disclosed sensors or components.

With continued reference to FIG. 2, sensors 208 may be disposed on a sense board 216. In one or more embodiments, sense board 216 may include opposing flat surfaces and may be configured to cover a portion of a battery module within a power source, such as a battery pack.

Sense board 216 may include, without limitation, a control circuit configured to perform and/or direct any actions performed by sense board 216 and/or any other component and/or element described in this disclosure. Sense board 216 may be consistent with the sense board disclosed in U.S. patent application Ser. No. 16/948,140 entitled, "SYSTEM AND METHOD FOR HIGH ENERGY DENSITY BATTERY MODULE" and incorporated herein by reference in its entirety.

With continued reference to FIG. 2, sensor suite 200 may be configured to detect events where voltage nears an upper voltage threshold or lower voltage threshold. The upper voltage threshold may be stored in a memory of, for example, a computing device for comparison with an instant measurement taken by any combination of sensors present within sensor suite 200. The upper voltage threshold may be calculated and calibrated based on factors relating to battery cell health, maintenance history, location within battery pack, designed application, and type, among others. Sensor suite 200 may measure voltage at an instant, over a period of time, or periodically. Sensor suite 200 may be configured to operate at any of these detection modes, switch between modes, or simultaneous measure in more than one mode. Sensor 108 may detect through sensor suite 200 events where voltage nears the lower voltage threshold. The lower voltage threshold may indicate power loss to or from an individual battery cell or portion of the battery pack. Sensor 108 may detect through sensor suite 200 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation. Additional disclosure related to a battery management system may be found in U.S. patent application Ser. Nos. 17/111,002 and 17/108,798 entitled "SYSTEMS AND METHODS FOR A BATTERY MANAGEMENT SYSTEM INTEGRATED IN A BATTERY PACK CONFIGURED FOR USE IN ELECTRIC AIRCRAFT", both of which are incorporated in their entirety herein by reference.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Figure 3:
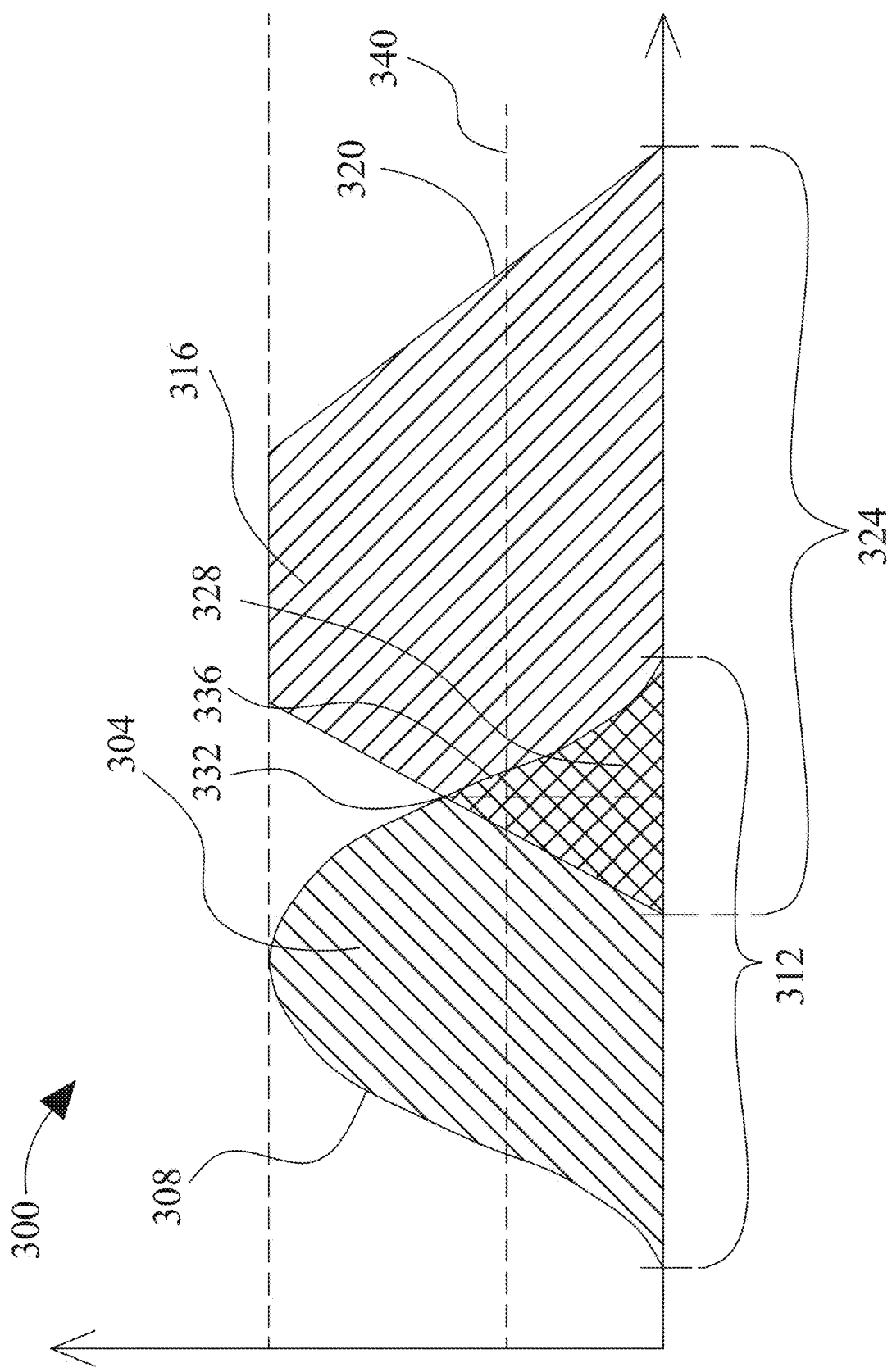
FIG. 3 is a block diagram illustrating exemplary embodiments of fuzzy sets for a threshold.

Now referring to FIG. 3, an exemplary embodiment of fuzzy set comparison 300 for a threshold is illustrated. A first fuzzy set 304 may be represented, without limitation, according to a first membership function 308 representing a probability that an input falling on a first range of values 312 is a member of the first fuzzy set 304, where the first membership function 308 has values on a range of probabilities such as without limitation the interval [0,1], and an area beneath the first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 3, first fuzzy set 304 may represent any value or combination of values as described above, including any sensor datum 108 such as, but not limited to, rate of charge, rate of discharge, state of health, and the like thereof. A second fuzzy set 316, which may represent any value which may be represented by first fuzzy set 304, may be defined by a second membership function 320 on a second range 324; second range 324 may be identical and/or overlap with first range 312 and/or may be combined with first range via Cartesian product or the like to generate a mapping permitting evaluation overlap of first fuzzy set 304 and second fuzzy set 316. Where first fuzzy set 304 and second fuzzy set 316 have a region 228 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process. For example and without limitation, the threshold may indicate a sufficient degree of overlap between sensor datum 108 and a value representing a potential disruption element that may indicate a sufficient match for purposes of determining disruption element 116. For example and without limitation, sensor 104 may detect an abnormally slow rate of charging from charging component 132, which may be indicative of a faulty connection between the charging connector and electric aircraft port 156. Computing device 112 may denote this event as disruption element 116. There may be multiple thresholds; for instance, a second threshold may indicate a sufficient match for purposes of pooling threshold 128 as described in this disclosure. Each threshold may be established by one or more user inputs. Alternatively or additionally, each threshold may be tuned by a machine-learning and/or statistical process, for instance and without limitation as described in further detail below.

With continued reference to FIG. 3, in an embodiment, a degree of match between fuzzy sets may be used to rank one resource against another. For instance, if two predictive prevalence values have fuzzy sets matching a probabilistic outcome fuzzy set by having a degree of overlap exceeding a threshold, computing device 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple disruption element 116 may be presented to a user in order of ranking for purposes of generating disconnection protocol 120.

Figure 4:
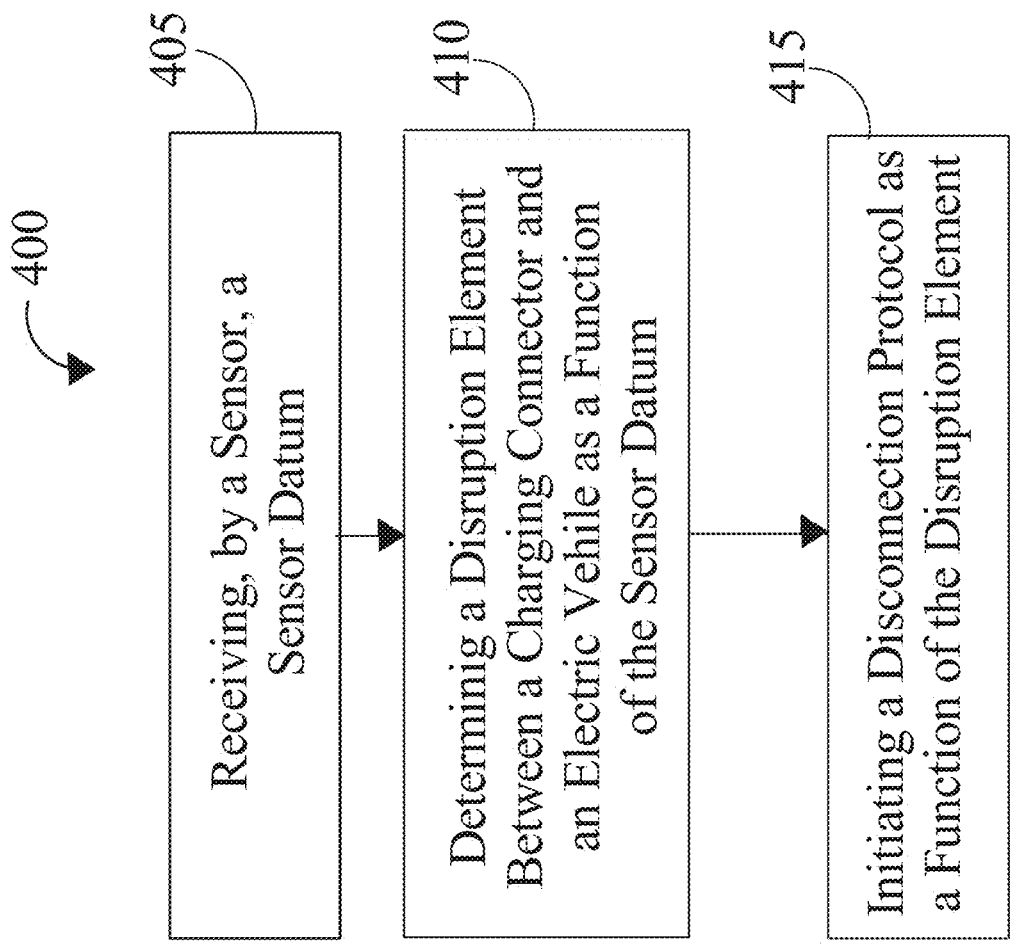
FIG. 4 is a flow diagram of an exemplary embodiment of a method for an emergency shutdown of an electric charger in response to a disconnection.

Referring now to FIG. 4, a flow diagram of an exemplary embodiment of a method 400 for emergency shutdown of an electric charger for an electric vehicle in response to a disconnection is provided. Method 400, at step 405, may include receiving, by a sensor, a sensor datum. The sensor may include any sensor as described herein. The sensor datum may include any sensor datum as described herein. In a non-limiting embodiment, method 400, at step 405, may include detecting a connection status of a charging component. The charging component may be any charging component as described herein. In a non-limiting embodiment, the charging component may include a charging connector. Persons skilled in the art, upon reviewing the entirety of this disclosure, will be aware of the various methods of detecting any data associated with charging and connections for purposes as described herein.

With continued reference to FIG. 4, method 400, at step 410, may include determining a disruption element, by a computing device, between a charging connector and an electric vehicle as a function of the sensor datum. The electric vehicle may include any electric vehicle as described herein. In a non-limiting embodiment, the electric vehicle may include an electric aircraft. The disruption element may include any disruption element as described herein. The computing device may include any computing device as described herein. In a non-limiting embodiment, method 400, at step 405, may include determining the connection status of a connection and/or lack of connection between the charging connector and an electric aircraft port of electric aircraft. The electric aircraft port may include any electric aircraft port as described herein. Persons skilled in the art, upon reviewing the entirety of this disclosure, will be aware of the various methods of determining a disruption and/or disconnection based on sensor data for purposes as described herein.

With continued reference to FIG. 4, method 400, at step 415, may include initiating a disconnection protocol as a function of the disruption element. The disconnection protocol may include any disconnection protocol as described herein. In a non-limiting embodiment, method 400, at step 415, may include initiating an emergency protocol. The emergency protocol may include any emergency protocol as described herein. In a non-limiting embodiment, the computing device may initiate the disconnection protocol as a function of a timer module. The timer module may include any timer module as described herein. Persons skilled in the art, upon reviewing the entirety of this disclosure, will be aware of the various embodiments of generating and initiating the disconnection protocol for purposes as described herein.

Figure 5:
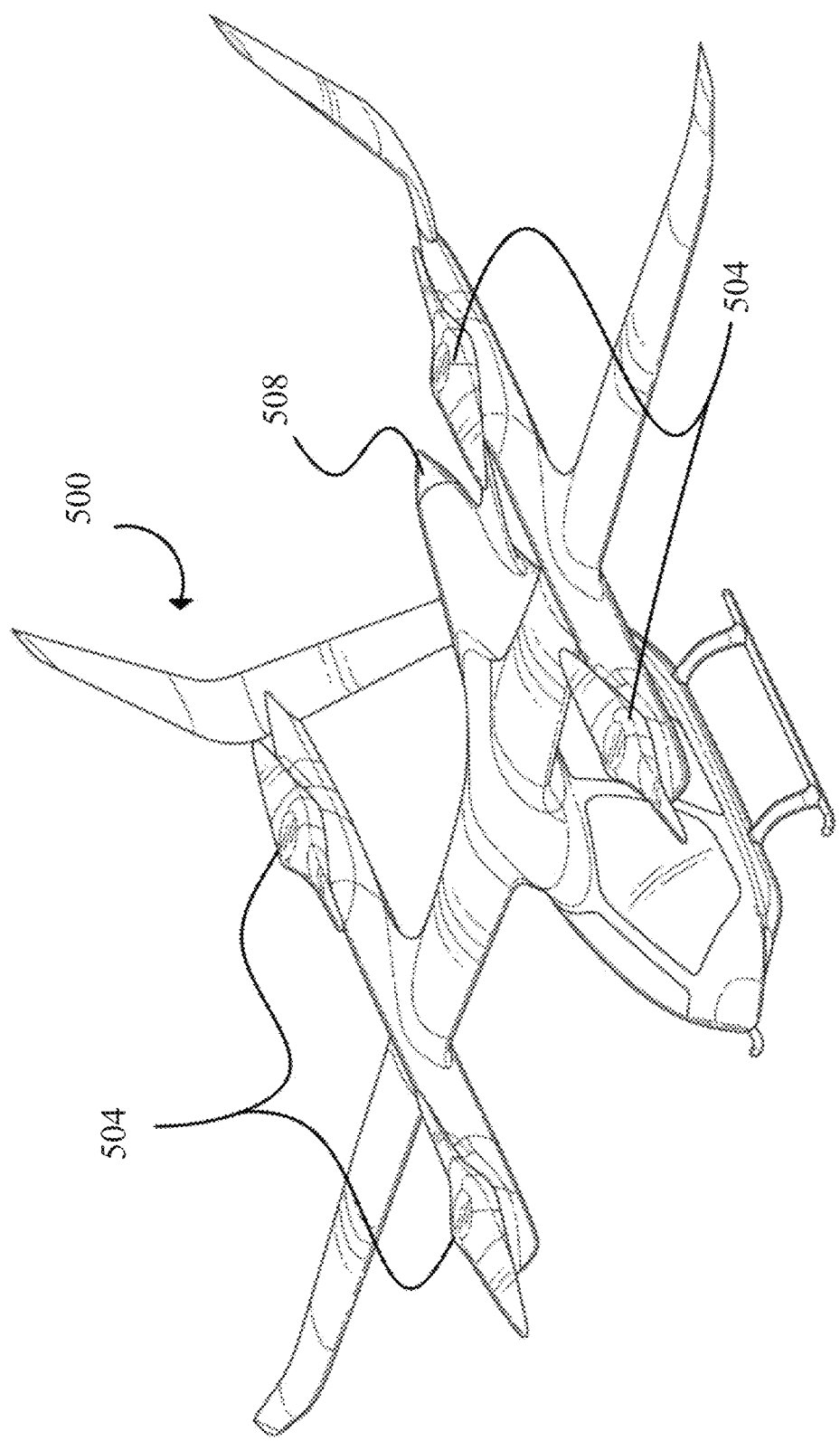
FIG. 5 is an illustration of an exemplary embodiment of an electric aircraft.

Referring now to FIG. 5, an exemplary embodiment of an aircraft 500, which may include, or be incorporated with, a system for optimization of a recharging flight plan is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 5, aircraft 500 may include an electrically powered aircraft. In embodiments, electrically powered aircraft may be an electric vertical takeoff and landing (eVTOL) aircraft. Aircraft 500 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 5.

Still referring to FIG. 5, aircraft 500 includes a fuselage 508. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 508 may include structural elements that physically support a shape and structure of an aircraft. Structural elements may take a plurality of forms, alone or in combination with other types. Structural elements may vary depending on a construction type of aircraft such as without limitation a fuselage 508. Fuselage 508 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 5, aircraft fuselage 508 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 508 orthogonal to a longitudinal (nose to tail) axis of the aircraft and may form a general shape of fuselage 508. A former may include differing cross-sectional shapes at differing locations along fuselage 508, as the former is the structural element that informs the overall shape of a fuselage 508 curvature. In embodiments, aircraft skin may be anchored to formers and strings such that the outer mold line of a volume encapsulated by formers and stringers comprises the same shape as aircraft 500 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 5, fuselage 508 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 5, fuselage 508 may include a semi-monocoque construction. Semi-monocoque construction, as used herein, is a partial monocoque construction, wherein a monocoque construction is describe above detail. In semi-monocoque construction, aircraft fuselage 508 may derive some structural support from stressed aircraft skin and some structural support from underlying frame structure made of structural elements. Formers or station frames can be seen running transverse to the long axis of fuselage 508 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 5, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 5, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 508. Monocoque comprises only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 5, it should be noted that an illustrative embodiment is presented only, and this disclosure in no way limits the form or construction method of a system and method for loading payload into an eVTOL aircraft. In embodiments, fuselage 508 may be configurable based on the needs of the eVTOL per specific mission or objective. The general arrangement of components, structural elements, and hardware associated with storing and/or moving a payload may be added or removed from fuselage 508 as needed, whether it is stowed manually, automatedly, or removed by personnel altogether. Fuselage 508 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 508 may also be configurable to accept certain specific cargo containers, or a receptacle that can, in turn, accept certain cargo containers.

Still referring to FIG. 5, aircraft 500 may include a plurality of laterally extending elements attached to fuselage

508. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 5, aircraft 500 includes a plurality of flight components 504. As used in this disclosure a "flight component" is a component that promotes flight and guidance of an aircraft. In an embodiment, flight component 504 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 5, plurality of flight components 504 may include at least a lift propulsor component 512. As used in this disclosure a "lift propulsor component" is a component and/or device used to propel a craft upward by exerting downward force on a fluid medium, which may include a gaseous medium such as air or a liquid medium such as water. Lift propulsor component 512 may include any device or component that consumes electrical power on demand to propel an electric aircraft in a direction or other vehicle while on ground or in-flight. For example, and without limitation, lift propulsor component 512 may include a rotor, propeller, paddle wheel and the like thereof, wherein a rotor is a component that produces torque along the longitudinal axis, and a propeller produces torquer along the vertical axis. In an embodiment, lift propulsor component 512 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component 512 may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 19.7° and a relative wind angle 16.5°. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of 10.7° as a function of a pitch angle of 17.1° and a relative wind angle 16.4°, wherein the angle adjusts and/or shifts to a second angle of 16.7° as a function of a pitch angle of 16.1° and a relative wind angle 16.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 5, lift propulsor component 512 may be configured to produce a lift. As used in this disclosure a "lift" is a perpendicular force to the oncoming flow direction of fluid surrounding the surface. For example, and without limitation relative air speed may be horizontal to aircraft 500, wherein lift force may be a force exerted in a vertical direction, directing aircraft 500 upwards. In an embodiment, and without limitation, lift propulsor component 512 may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components such as a power sources may apply a torque on lift propulsor component 512 to produce lift. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 5, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 500 may be incorporated.

In an embodiment, and still referring to FIG. 5, an energy source may be used to provide a steady supply of electrical power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 5, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

In an embodiment and still referring to FIG. 5, plurality of flight components 504 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 30° from the longitudinal axis of aircraft 500. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 5, plurality of flight components 504 may include a pusher component 516. As used in this disclosure a "pusher component" is a component that pushes and/or thrusts an aircraft through a medium. As a non-limiting example, pusher component 516 may include a pusher propeller, a paddle wheel, a pusher motor, a pusher propulsor, and the like. Additionally, or alternatively, pusher flight component may include a plurality of pusher flight components. Pusher component 516 is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 500 in a horizontal direction along a longitudinal axis. As a further non-limiting example, pusher component 516 may twist and/or rotate to pull air behind it and, at the same time, push aircraft 500 forward with an equal amount of force. In an embodiment, and without limitation, the more air forced behind aircraft, the greater the thrust force with which the aircraft is pushed horizontally will be. In another embodiment, and without limitation, forward thrust may force aircraft 500 through the medium of relative air. Additionally or alternatively, plurality of flight components 504 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 5, aircraft 500 may include a flight controller located within fuselage 508, wherein a flight controller is described in detail below, in reference to FIG. 5. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 50 and one or more airfoil shapes of the laterally extending elements, wherein an airfoil is described above in detail. As a further non-limiting example, flight controller may operate the fixed-wing flight capability as a function of reducing applied torque on lift propulsor component 512. For example, and without limitation, flight controller may reduce a torque of 19 Nm applied to a first set of lift propulsor components to a torque of 16 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component 516. For example, and without limitation, flight controller may increase a forward thrust of 1000 kN produced by pusher component 516 to a forward thrust of 1100 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 500. Inertia compensator may alternatively or additionally include any computing device used as an inertia compensator as described in U.S. Nonprovisional application Ser. No. 17/106,557, and entitled "SYSTEM AND METHOD FOR FLIGHT CONTROL IN ELECTRIC AIRCRAFT," the entirety of which is incorporated herein by reference.

In an embodiment, and still referring to FIG. 5, flight controller may be configured to perform a reverse thrust command. As used in this disclosure a "reverse thrust command" is a command to perform a thrust that forces a medium towards the relative air opposing aircraft 190. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155 and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 5, flight controller may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, and entitled "AIRCRAFT FOR SELF-NEUTRALIZING FLIGHT," the entirety of which is incorporated herein by reference. As used in this disclosure a "failure event" is a failure of a lift propulsor component of the plurality of lift propulsor components. For example, and without limitation, a failure event may denote a rotation degradation of a rotor, a reduced torque of a rotor, and the like thereof.

Figure 6:
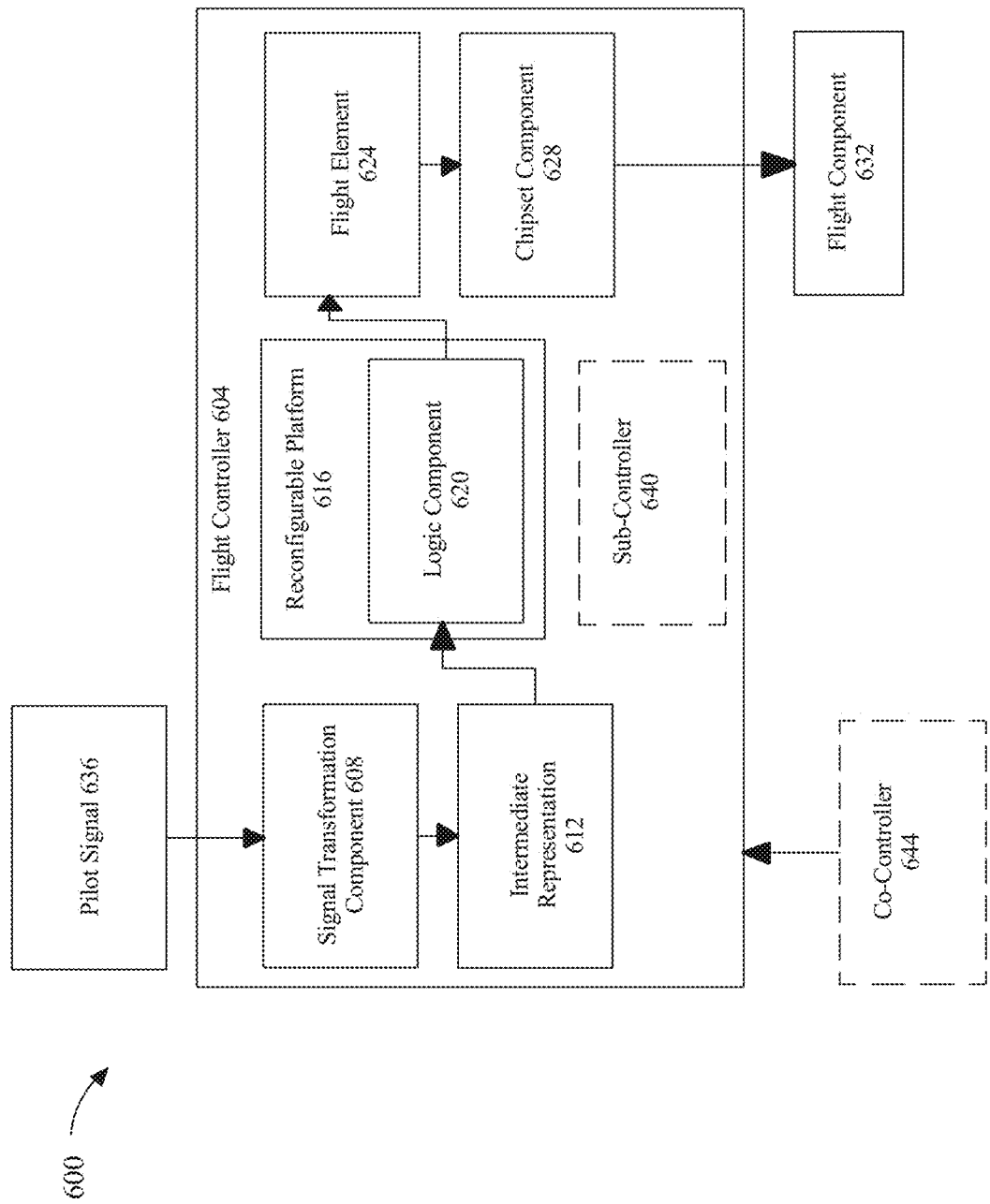
FIG. 6 is a block diagram of an exemplary flight controller.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 6-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above. In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
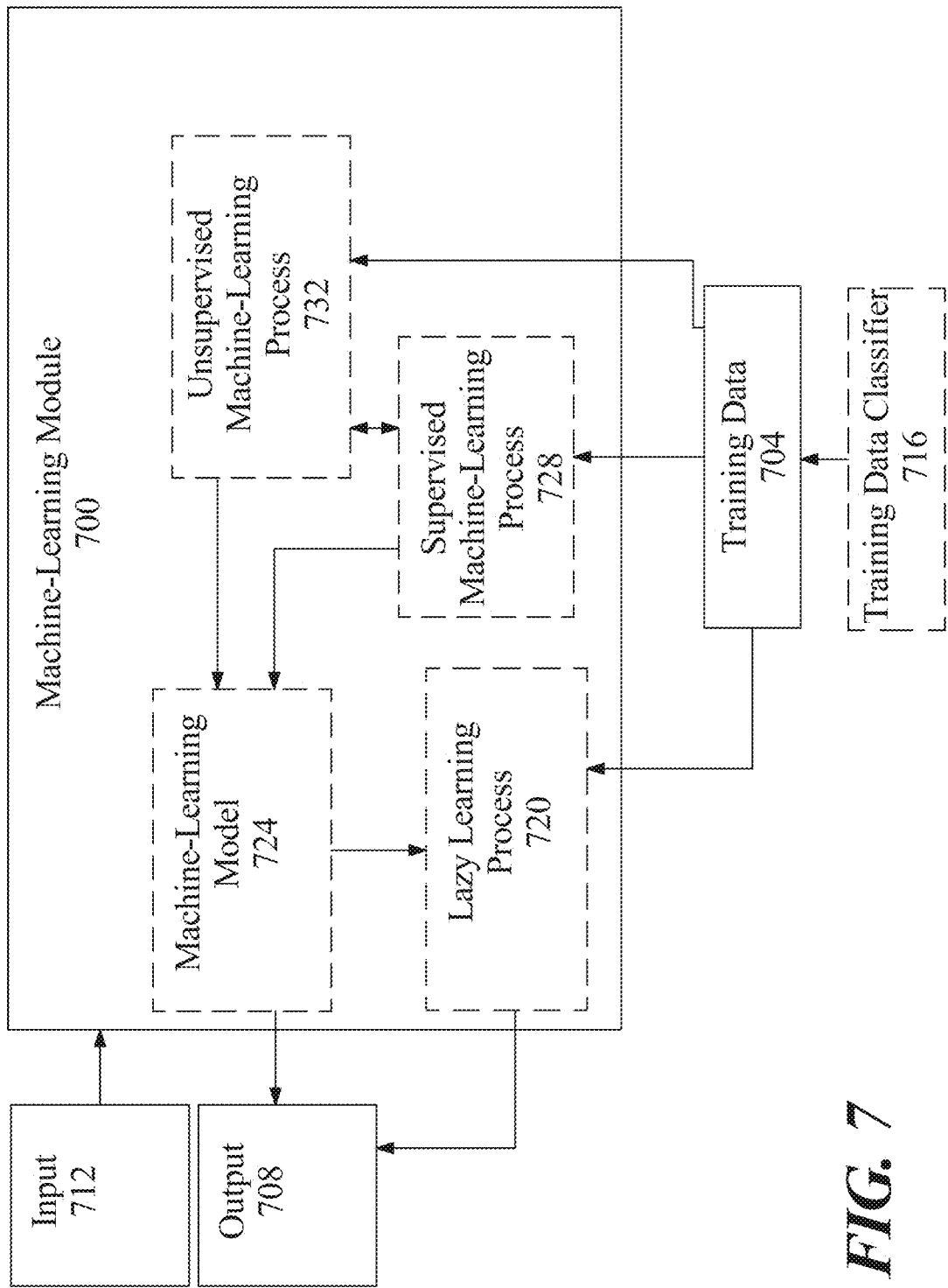
FIG. 7 is a block diagram of an exemplary machine-learning process.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative examples, a sensor datum may be an input and a disruption element may be an output.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to disruption element into various levels of danger levels and/or priority levels, wherein the higher levels may denote the response of an emergency protocol for which a subset of training data may be selected.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a sensor datum as an input, a disruption element as an output, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
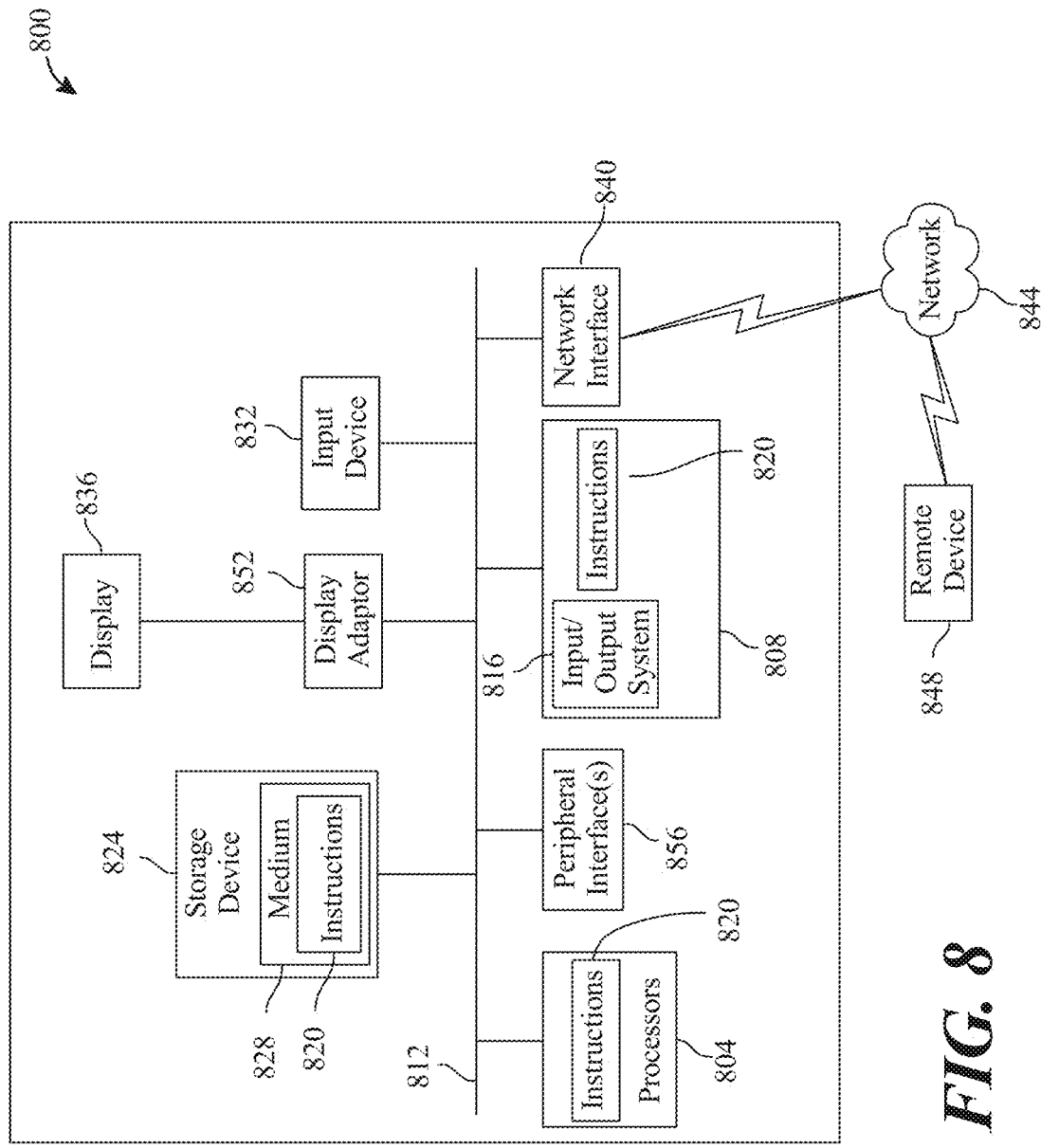
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for emergency shutdown of an electric charger using a de-energizing protocol, the system comprising:
   a computing device, wherein the computing device is configured to:
   receive a sensor datum from a sensor communicatively connected to a connector of the electric charger;
   determine a charging connection between the connector and an electric aircraft;
   determine a disruption element of the charging connection as a function of the sensor datum; and
   initiate a de-energizing protocol as a function of the disruption element.

2. The system of claim 1, wherein the de-energizing protocol comprises terminating a flow of electrical power between the charging connector and the electric aircraft.

3. The system of claim 2, wherein terminating the flow of electrical power comprises shutting off a power source of the electric charger such that the electrical power does not flow between a conductor of the connector and a port of the electric aircraft.

4. The system of claim 1, wherein:
   the sensor datum further comprises a health status of a flight component of the electric aircraft; and
   the disruption element comprises an undesirable condition status of the flight component.

5. The system of claim 1, wherein the disruption element further comprises a disconnection between the charging connector and the electric vehicle.

6. The system of claim 5, wherein:
   the sensor comprises a proximity pin, the proximity pin configured to detect the disconnection; and
   the disconnection comprises a disconnection of a mechanical connection between the connector and the electric aircraft.

7. The system of claim 5, wherein the disconnection further comprises a disconnection of an electrical connection.

8. The system of claim 1, wherein the sensor is disposed on the connector.

9. The system of claim 1, wherein the sensor datum further comprises a connection status.

10. The system of claim 1, wherein the disruption element further is configured to trigger a timer module, wherein the timer module is configured to initiate the de-energizing protocol.

11. A method for emergency shutdown of an electric charger using a de-energizing protocol, the method comprising:
   receiving, by a computing device, a sensor datum from a sensor communicatively connected to a connector of the electric charger;
   determining, by the computing device, a charging connection between the connector and an electric aircraft;
   determining, by the computing device, a disruption element of the charging connection as a function of the sensor datum; and
   initiating, by the computing device, a de-energizing protocol as a function of the disruption element.

12. The method of claim 11, wherein initiating the de-energizing protocol comprises terminating a flow of electrical power between the charging connector and the electric aircraft.

13. The method of claim 12, wherein terminating the flow of electrical power comprises shutting off a power source of the electric charger such that the electrical power does not flow between a conductor of the connector and a port of the electric aircraft.

14. The method of claim 11, wherein:
the sensor datum further comprises a health status of a flight component of the electric aircraft; and
the disruption element comprises an undesirable condition status of the flight component.

15. The method of claim 11, wherein the disruption element further comprises a disconnection between the charging connector and the electric vehicle.

16. The method of claim 15, wherein:
the sensor comprises a proximity pin, the proximity pin configured to detect the disconnection; and
the disconnection comprises a disconnection of a mechanical connection between the connector and the electric aircraft.

17. The method of claim 15, wherein the disconnection further comprises a disconnection of an electrical connection.

18. The method of claim 11, wherein the sensor is disposed on the connector.

19. The method of claim 11, wherein the sensor datum further comprises a connection status.

20. The method of claim 11, wherein the disruption element further is configured to trigger a timer module, wherein the timer module is configured to initiate the de-energizing protocol.

* * * * *